US007673084B2

(12) United States Patent
Krampl et al.

(10) Patent No.: US 7,673,084 B2
(45) Date of Patent: Mar. 2, 2010

(54) BUS SYSTEM AND METHODS OF OPERATION USING A COMBINED DATA AND SYNCHRONIZATION LINE TO COMMUNICATE BETWEEN BUS MASTER AND SLAVES

(75) Inventors: Gerfried Krampl, Villach (AT); Peter Linortner, Villach (AT)

(73) Assignee: Infineon Technologies AG, Munich (DE)

( * ) Notice: Subject to any disclaimer, the term of this patent is extended or adjusted under 35 U.S.C. 154(b) by 286 days.

(21) Appl. No.: 11/708,663

(22) Filed: Feb. 20, 2007

(65) Prior Publication Data

US 2008/0201507 A1    Aug. 21, 2008

(51) Int. Cl.
*G06F 13/00* (2006.01)
*G06F 1/12* (2006.01)

(52) U.S. Cl. ..................... 710/110; 713/400
(58) Field of Classification Search .......... 710/110, 710/29, 30; 713/400, 401, 500, 501
See application file for complete search history.

(56) References Cited

U.S. PATENT DOCUMENTS

| | | | | |
|---|---|---|---|---|
| 3,993,870 A * | 11/1976 | Schwartz | .................... | 370/438 |
| 4,613,979 A | 9/1986 | Kent | | |
| 4,691,126 A | 9/1987 | Splett et al. | | |
| 4,777,633 A | 10/1988 | Fletcher et al. | | |
| 4,779,093 A * | 10/1988 | Watkins | ................. | 340/825.57 |
| 4,888,769 A | 12/1989 | Deal | | |
| 5,014,272 A * | 5/1991 | Yoshida | ....................... | 370/513 |
| 5,524,237 A * | 6/1996 | Bestler et al. | ............... | 713/600 |
| 5,748,684 A | 5/1998 | Sanchez | | |
| 5,793,993 A | 8/1998 | Broedner et al. | | |
| 5,931,902 A | 8/1999 | Shindoh et al. | | |
| 5,987,038 A * | 11/1999 | Staszewski et al. | ......... | 370/514 |
| 6,108,414 A | 8/2000 | Ahrndt et al. | | |
| 6,154,509 A * | 11/2000 | Bishop | ....................... | 375/371 |
| 6,404,780 B1 * | 6/2002 | Laturell et al. | ............... | 370/510 |
| 6,516,422 B1 | 2/2003 | Doblar et al. | | |
| 6,640,239 B1 | 10/2003 | Gidwani | | |
| 6,700,877 B1 | 3/2004 | Lorenz et al. | | |
| 6,937,616 B1 | 8/2005 | Rezvani et al. | | |
| 7,346,048 B1 * | 3/2008 | Vogel | ........................... | 370/376 |
| 2003/0217213 A1 | 11/2003 | Imming et al. | | |
| 2004/0059852 A1 * | 3/2004 | Sun et al. | ..................... | 710/110 |
| 2004/0120351 A1 * | 6/2004 | Li et al. | ....................... | 370/498 |
| 2005/0110546 A1 * | 5/2005 | Park | ............................ | 327/185 |
| 2005/0141683 A1 | 6/2005 | Ishii et al. | | |
| 2008/0048625 A1 * | 2/2008 | Chapuis | ....................... | 323/234 |
| 2008/0062897 A1 * | 3/2008 | Loffink et al. | ................ | 370/294 |

FOREIGN PATENT DOCUMENTS

| | | |
|---|---|---|
| DE | 38 12 611 A1 | 2/1989 |
| DE | 197 25 572 A1 | 1/1999 |
| DE | 197 33 906 A1 | 2/1999 |
| DE | 198 25 060 A1 | 12/1999 |
| DE | 199 27 579 A1 | 12/2000 |
| FR | 2 863 802 A1 | 6/2005 |
| JP | 08-63430 | 3/1996 |
| JP | 11-203250 | 7/1999 |
| KR | 1020020033249 A | 5/2002 |
| WO | WO 2006/066412 A1 | 6/2006 |

OTHER PUBLICATIONS

Architecture Framework, Enterprise Computer Telephony Forum, 1996, 52 pgs., revision 1.0, ECTF, Fremont, CA.

(Continued)

*Primary Examiner*—Glenn A Auve
(74) *Attorney, Agent, or Firm*—Slater & Matsil, L.L.P.

(57) ABSTRACT

A bus system and methods for initialization and communication in a bus system are presented.

30 Claims, 15 Drawing Sheets

OTHER PUBLICATIONS

Flegg. R., "Computer Telephony Architectures: MVIP, H-MVIP, and Scbus," IEEE Communications Magazine, Apr. 1996, pp. 60-64, IEEE.

H.100 Hardware Compatibility Specification:CT Bus, Enterprise Computer Telephony Forum, 1996, 56 pgs., revision 1.0, ECTF, Fremont, CA.

Dos Reis Filho, C., et al., "CMOS Custom Integrated Circuit for a 38.4Kbps Master-Slave In-Vehicle Data Communication Network," IEEE Intelligent Transportation Systems Conference Proceedings, Oct. 1-3, 2000, pp. 316-321, IEEE, Dearborn, MI.

* cited by examiner

FIG 13

| 26 | 24 23 | | 0 |
|---|---|---|---|
| 0 0 0 | 0 0 0 0 0 0 0 0 0 0 0 0 0 0 0 0 0 0 0 0 0 0 0 | | |

| | | chan | 0 |
|---|---|---|---|
| 1 1 1 | 1 1 1 1 1 1 1 1 0 0 0 0 0 0 0 0 0 0 | 2 | |
| 26 | 24 23 | | |

FIG 14

| 26 | 24 23 | | 0 |
|---|---|---|---|
| 0 0 0 | 0 0 0 0 0 0 0 0 0 0 0 0 0 0 0 0 0 0 0 0 0 0 0 | | |

| | | delay | chan | 0 |
|---|---|---|---|---|
| 1 1 1 0 1 1 1 0 0 0 | 1 0 1 1 | 11 | 3 | 2 |
| 26 | 24 23 | 16 15 | | |

FIG 15

| 26 | 24 23 | 0 |
|---|---|---|
| 0 0 0 | 0 0 0 0 0 0 0 0 0 0 0 0 0 0 0 0 0 0 0 0 0 0 0 | |

| | | 0 |
|---|---|---|
| 1 1 1 0 1 0 0 0 1 1 1 0 1 0 0 0 1 1 1 1 0 1 0 1 0 1 | |
| 26 | 24 23 | |

FIG 16

| chan | 24 23 | control data 1 | 0 |
|---|---|---|---|
| | | | |
| 26 | | | |

| | | control data 2 | 0 |
|---|---|---|---|
| 1 1 0 | | | |
| 26 | 24 23 | | |

FIG 20B

| | | | | | | | | | |
|---|---|---|---|---|---|---|---|---|---|
| ctrl1 | read(dc, 5) | 1 | channel 0 | 1 | channel 1 | 1 | channel 2 | 1 | channel 3 |
| ctrl2 | read(dc, 5) | 1 | channel 4 | 1 | channel 5 | 1 | channel 6 | 1 | channel 7 |
| ctrl1 | read(dc, 6) | 1 | channel 0 | 1 | channel 1 | 1 | channel 2 | 1 | channel 3 |
| ctrl2 | read(dc, 6) | 1 | channel 4 | 1 | channel 5 | 1 | channel 6 | 1 | channel 7 |
| ctrl1 | read(dc, 7) | 1 | channel 0 | 1 | channel 1 | 1 | channel 2 | 1 | channel 3 |
| ctrl2 | read(dc, 7) | 1 | channel 4 | 1 | channel 5 | 1 | channel 6 | 1 | channel 7 |
| ctrl1 | read(meas, 4) | 1 | channel 0 | 1 | channel 1 | 1 | channel 2 | 1 | channel 3 |
| ctrl2 | read(meas, 4) | 1 | channel 4 | 1 | channel 5 | 1 | channel 6 | 1 | channel 7 |
| ctrl1 | read(meas, 5) | 1 | channel 0 | 1 | channel 1 | 1 | channel 2 | 1 | channel 3 |
| ctrl2 | read(meas, 5) | 1 | channel 4 | 1 | channel 5 | 1 | channel 6 | 1 | channel 7 |
| ctrl1 | read(meas, 6) | 1 | channel 0 | 1 | channel 1 | 1 | channel 2 | 1 | channel 3 |
| ctrl2 | read(meas, 6) | 1 | channel 4 | 1 | channel 5 | 1 | channel 6 | 1 | channel 7 |
| ctrl1 | read(meas, 7) | 1 | channel 0 | 1 | channel 1 | 1 | channel 2 | 1 | channel 3 |
| ctrl2 | read(meas, 7) | 1 | channel 4 | 1 | channel 5 | 1 | channel 6 | 1 | channel 7 |
| ctrl1 | cmd(4) | 1 | channel 0 | 1 | channel 1 | 1 | channel 2 | 1 | channel 3 |
| ctrl2 | cmd(4) | 1 | channel 4 | 1 | channel 5 | 1 | channel 6 | 1 | channel 7 |
| ctrl1 | cmd(5) | 1 | channel 0 | 1 | channel 1 | 1 | channel 2 | 1 | channel 3 |
| ctrl2 | cmd(5) | 1 | channel 4 | 1 | channel 5 | 1 | channel 6 | 1 | channel 7 |
| ctrl1 | cmd(6) | 1 | channel 0 | 1 | channel 1 | 1 | channel 2 | 1 | channel 3 |
| ctrl2 | cmd(6) | 1 | channel 4 | 1 | channel 5 | 1 | channel 6 | 1 | channel 7 |
| ctrl1 | cmd(7) | 1 | channel 0 | 1 | channel 1 | 1 | channel 2 | 1 | channel 3 |
| ctrl2 | cmd(7) | 1 | channel 4 | 1 | channel 5 | 1 | channel 6 | 1 | channel 7 |
| ctrl1 | read(uconst, 0) | 1 | channel 0 | 1 | channel 1 | 1 | channel 2 | 1 | channel 3 |
| ctrl2 | read(uconst, 0) | 1 | channel 4 | 1 | channel 5 | 1 | channel 6 | 1 | channel 7 |
| ctrl1 | read(uconst, 1) | 1 | channel 0 | 1 | channel 1 | 1 | channel 2 | 1 | channel 3 |
| ctrl2 | read(uconst, 1) | 1 | channel 4 | 1 | channel 5 | 1 | channel 6 | 1 | channel 7 |
| ctrl1 | read(uconst, 2) | 1 | channel 0 | 1 | channel 1 | 1 | channel 2 | 1 | channel 3 |
| ctrl2 | read(uconst, 2) | 1 | channel 4 | 1 | channel 5 | 1 | channel 6 | 1 | channel 7 |
| ctrl1 | read(uconst, 3) | 1 | channel 0 | 1 | channel 1 | 1 | channel 2 | 1 | channel 3 |
| ctrl2 | read(uconst, 3) | 1 | channel 4 | 1 | channel 5 | 1 | channel 6 | 1 | channel 7 |
| ctrl1 | read(uconst, 4) | 1 | channel 0 | 1 | channel 1 | 1 | channel 2 | 1 | channel 3 |
| ctrl2 | read(uconst, 4) | 1 | channel 4 | 1 | channel 5 | 1 | channel 6 | 1 | channel 7 |
| ctrl1 | read(uconst, 5) | 1 | channel 0 | 1 | channel 1 | 1 | channel 2 | 1 | channel 3 |
| ctrl2 | read(uconst, 5) | 1 | channel 4 | 1 | channel 5 | 1 | channel 6 | 1 | channel 7 |
| ctrl1 | read(uconst, 6) | 1 | channel 0 | 1 | channel 1 | 1 | channel 2 | 1 | channel 3 |
| ctrl2 | read(uconst, 6) | 1 | channel 4 | 1 | channel 5 | 1 | channel 6 | 1 | channel 7 |
| ctrl1 | read(uconst, 7) | 1 | channel 0 | 1 | channel 1 | 1 | channel 2 | 1 | channel 3 |
| ctrl2 | read(uconst, 7) | 1 | channel 4 | 1 | channel 5 | 1 | channel 6 | 1 | channel 7 |
| ctrl1 | read(meas, 0) | 1 | channel 0 | 1 | channel 1 | 1 | channel 2 | 1 | channel 3 |
| ctrl2 | read(meas, 0) | 1 | channel 4 | 1 | channel 5 | 1 | channel 6 | 1 | channel 7 |
| ctrl1 | read(meas, 1) | 1 | channel 0 | 1 | channel 1 | 1 | channel 2 | 1 | channel 3 |
| ctrl2 | read(meas, 1) | 1 | channel 4 | 1 | channel 5 | 1 | channel 6 | 1 | channel 7 |
| ctrl1 | read(meas, 2) | 1 | channel 0 | 1 | channel 1 | 1 | channel 2 | 1 | channel 3 |
| ctrl2 | read(meas, 2) | 1 | channel 4 | 1 | channel 5 | 1 | channel 6 | 1 | channel 7 |
| ctrl1 | read(meas, 3) | 1 | channel 0 | 1 | channel 1 | 1 | channel 2 | 1 | channel 3 |
| ctrl2 | cmd(0) | 1 | channel 4 | 1 | channel 5 | 1 | channel 6 | 1 | channel 7 |

| 8 kHz | 8 kHz |
|---|---|
| 2 kHz (500 us) | |

FIG 20C

| | | | | | | | | | |
|---|---|---|---|---|---|---|---|---|---|
| ctrl2 | cmd(0) | 1 | channel 4 | 1 | channel 5 | 1 | channel 6 | 1 | channel 7 | 1 |
| ctrl1 | cmd(1) | 1 | channel 0 | 1 | channel 1 | 1 | channel 2 | 1 | channel 3 | 1 |
| ctrl2 | cmd(1) | 1 | channel 4 | 1 | channel 5 | 1 | channel 6 | 1 | channel 7 | 1 |
| ctrl1 | cmd(2) | 1 | channel 0 | 1 | channel 1 | 1 | channel 2 | 1 | channel 3 | 1 |
| ctrl2 | cmd(2) | 1 | channel 4 | 1 | channel 5 | 1 | channel 6 | 1 | channel 7 | 1 |
| ctrl1 | cmd(3) | 1 | channel 0 | 1 | channel 1 | 1 | channel 2 | 1 | channel 3 | 1 |
| ctrl2 | cmd(3) | 1 | channel 4 | 1 | channel 5 | 1 | channel 6 | 1 | channel 7 | 1 |
| ctrl1 | write(udac/idac, 0) | 1 | channel 0 | 1 | channel 1 | 1 | channel 2 | 1 | channel 3 | 1 |
| ctrl2 | write(udac/idac, 0) | 1 | channel 4 | 1 | channel 5 | 1 | channel 6 | 1 | channel 7 | 1 |
| ctrl1 | write(udac/idac, 1) | 1 | channel 0 | 1 | channel 1 | 1 | channel 2 | 1 | channel 3 | 1 |
| ctrl2 | write(udac/idac, 1) | 1 | channel 4 | 1 | channel 5 | 1 | channel 6 | 1 | channel 7 | 1 |
| ctrl1 | write(udac/idac, 2) | 1 | channel 0 | 1 | channel 1 | 1 | channel 2 | 1 | channel 3 | 1 |
| ctrl2 | write(udac/idac, 2) | 1 | channel 4 | 1 | channel 5 | 1 | channel 6 | 1 | channel 7 | 1 |
| ctrl1 | write(udac/idac, 3) | 1 | channel 0 | 1 | channel 1 | 1 | channel 2 | 1 | channel 3 | 1 |
| ctrl2 | write(udac/idac, 3) | 1 | channel 4 | 1 | channel 5 | 1 | channel 6 | 1 | channel 7 | 1 |
| ctrl1 | write(udac/idac, 4) | 1 | channel 0 | 1 | channel 1 | 1 | channel 2 | 1 | channel 3 | 1 |
| ctrl2 | write(udac/idac, 4) | 1 | channel 4 | 1 | channel 5 | 1 | channel 6 | 1 | channel 7 | 1 |
| ctrl1 | write(udac/idac, 5) | 1 | channel 0 | 1 | channel 1 | 1 | channel 2 | 1 | channel 3 | 1 |
| ctrl2 | write(udac/idac, 5) | 1 | channel 4 | 1 | channel 5 | 1 | channel 6 | 1 | channel 7 | 1 |
| ctrl1 | write(udac/idac, 6) | 1 | channel 0 | 1 | channel 1 | 1 | channel 2 | 1 | channel 3 | 1 |
| ctrl2 | write(udac/idac, 6) | 1 | channel 4 | 1 | channel 5 | 1 | channel 6 | 1 | channel 7 | 1 |
| ctrl1 | write(udac/idac, 7) | 1 | channel 0 | 1 | channel 1 | 1 | channel 2 | 1 | channel 3 | 1 |
| ctrl2 | write(udac/idac, 7) | 1 | channel 4 | 1 | channel 5 | 1 | channel 6 | 1 | channel 7 | 1 |
| ctrl1 | read(meas, 4) | 1 | channel 0 | 1 | channel 1 | 1 | channel 2 | 1 | channel 3 | 1 |
| ctrl2 | read(meas, 4) | 1 | channel 4 | 1 | channel 5 | 1 | channel 6 | 1 | channel 7 | 1 |
| ctrl1 | read(meas, 5) | 1 | channel 0 | 1 | channel 1 | 1 | channel 2 | 1 | channel 3 | 1 |
| ctrl2 | read(meas, 5) | 1 | channel 4 | 1 | channel 5 | 1 | channel 6 | 1 | channel 7 | 1 |
| ctrl1 | read(meas, 6) | 1 | channel 0 | 1 | channel 1 | 1 | channel 2 | 1 | channel 3 | 1 |
| ctrl2 | read(meas, 6) | 1 | channel 4 | 1 | channel 5 | 1 | channel 6 | 1 | channel 7 | 1 |
| ctrl1 | read(meas, 7) | 1 | channel 0 | 1 | channel 1 | 1 | channel 2 | 1 | channel 3 | 1 |
| ctrl2 | read(meas, 7) | 1 | channel 4 | 1 | channel 5 | 1 | channel 6 | 1 | channel 7 | 1 |
| ctrl1 | cmd(4) | 1 | channel 0 | 1 | channel 1 | 1 | channel 2 | 1 | channel 3 | 1 |
| ctrl2 | cmd(4) | 1 | channel 4 | 1 | channel 5 | 1 | channel 6 | 1 | channel 7 | 1 |
| ctrl1 | cmd(5) | 1 | channel 0 | 1 | channel 1 | 1 | channel 2 | 1 | channel 3 | 1 |
| ctrl2 | cmd(5) | 1 | channel 4 | 1 | channel 5 | 1 | channel 6 | 1 | channel 7 | 1 |
| ctrl1 | cmd(6) | 1 | channel 0 | 1 | channel 1 | 1 | channel 2 | 1 | channel 3 | 1 |
| ctrl2 | cmd(6) | 1 | channel 4 | 1 | channel 5 | 1 | channel 6 | 1 | channel 7 | 1 |
| ctrl1 | cmd(7) | 1 | channel 0 | 1 | channel 1 | 1 | channel 2 | 1 | channel 3 | 1 |
| ctrl2 | cmd(7) | 1 | channel 4 | 1 | channel 5 | 1 | channel 6 | 1 | channel 7 | 1 |

| | |
|---|---|
| 4 KHz (250us) | |
| | 8 KHz |

BUS SYSTEM AND METHODS OF OPERATION USING A COMBINED DATA AND SYNCHRONIZATION LINE TO COMMUNICATE BETWEEN BUS MASTER AND SLAVES

BACKGROUND OF THE INVENTION

The present invention relates to a bus system and to methods of operating the bus system.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIGS. 11-19 show embodiments of commands used for communication in a bus system;
and
FIGS. 20A-20C show an embodiment of a frame used for communication in a bus system.

DETAILED DESCRIPTION OF THE INVENTION

In the following, embodiments of bus systems according to the present invention will be discussed. After that, embodiments of methods of operation of bus systems will be described.

FIGS. 1-6 show embodiments of bus systems according to the present invention. In general, the embodiments which will be described comprise a first data line for sending data from a bus master to one or more bus slaves, a second data line for sending data from said bus slaves to said bus master, and a clock line for supplying a common clock signal to the bus master and the one or more bus slaves.

Figure 1:
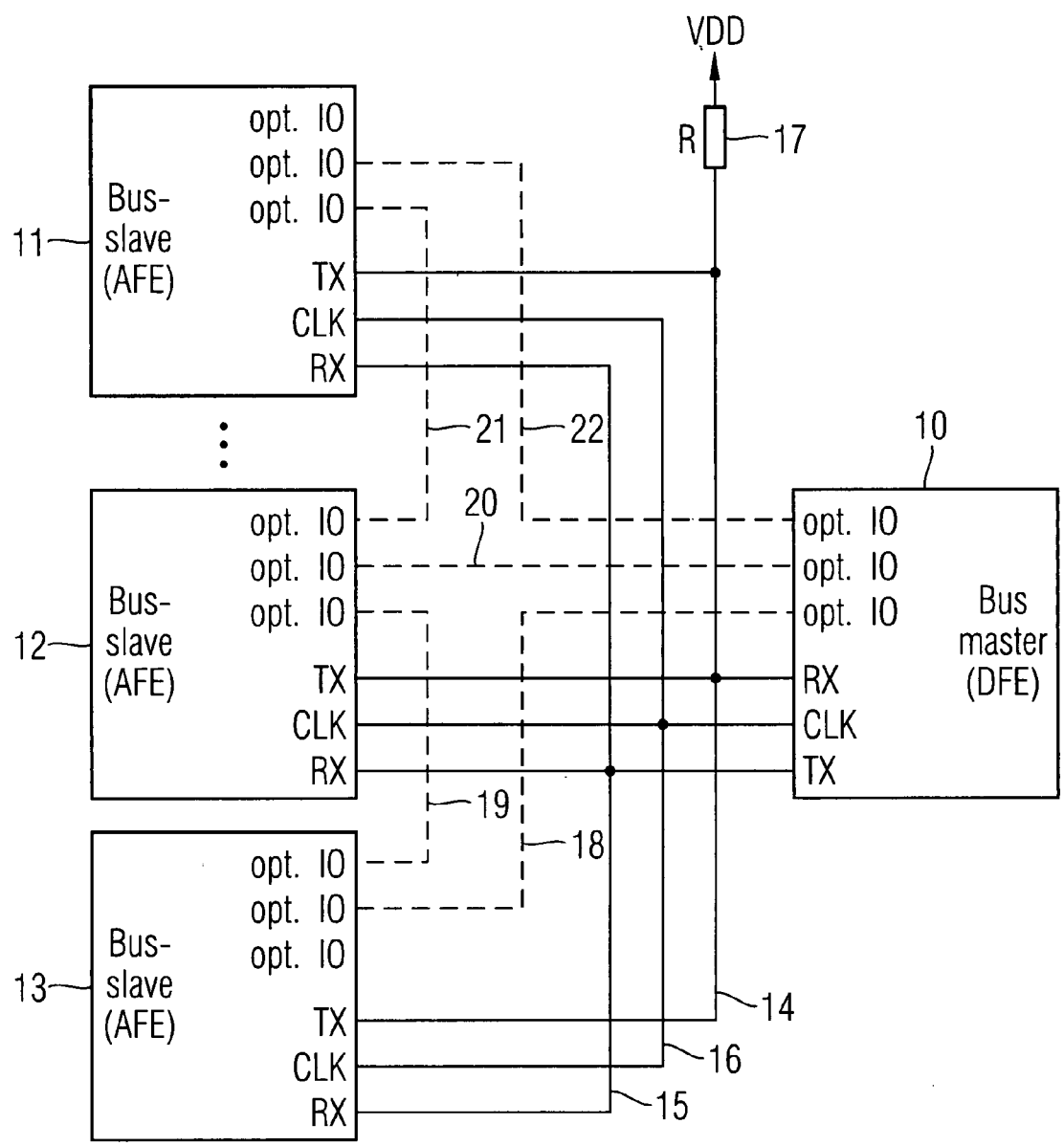
FIG. 1 shows a first embodiment of a bus system.

Referring now to FIG. 1, a first embodiment of a bus system employed for communication between a bus master 10 and bus slaves 11, 12 and 13 is shown. As indicated by dots between bus slaves 11 and 12, the embodiment shown is not limited to three bus slaves, but any number of bus slaves may be present.

In this respect, the term "bus master" generally refers to an entity which controls operation of the bus, for example assigns addresses and the like to the bus slaves and initiates communication via the bus. The term "bus slave", on the other hand, relates to an entity which receives such information from the bus master and responds to communications from the bus master.

In the embodiment shown, bus master 10 is a digital front end of a communication system, for example a voice communication system, and bus slaves 11, 12 and 13 are analog front ends. In particular, in the embodiment shown, the bus slaves are coupled to communication lines (not shown) to receive or send analog data via these communication lines, convert the analog data into digital data to be forwarded to bus master 10 serving as digital front end for further processing of the digital data, or to convert digital data received from bus master 10 into analog data and send the same over the communication lines. In case of voice data, the system may for example be a voice over IP system or a POTS (Plain Old Telephone System) system, but other types of voice or more general audio systems are also possible in other embodiments.

The embodiment of the bus shown in FIG. 1 comprises a first data line 14, a second data line 15 and a clock line 16. First data line 14 connects a receive pin RX of bus master 10 with transmit pins TX of bus slaves 11, 12 and 13 and thus serves for transmitting data from bus slaves 11, 12 and 13 to bus master 10. Second data line 15 connects a transmit pin TX of bus master 10 with respective receive pins RX of bus slaves 11, 12 and 13. Therefore, in the embodiment shown, second data line 15 serves for transmitting data from bus master 10 to bus slaves 11, 12 and 13.

As already mentioned above, bus slaves 11, 12 and 13 comprise a converter for converting analog signals to digital signals and vice versa so that the data transmission on first data line 14 and second data line 15 in the embodiment shown is a digital serial data transmission.

In the embodiment shown, first data line 14 is connected to a positive supply voltage VDD via a pull-up resistor 17 such that when no signal is applied to first data line 14, the potential on first data line 14 is pulled to positive supply voltage VDD signifying, in the embodiment shown, a logic 1. A similar pull-up resistor may be coupled to second data line 15. Pull-up resistor 17 in an embodiment may have a resistance between 100Ω and 500Ω.

The bus of the embodiment of FIG. 1 furthermore comprises clock line 16 connecting clock pins of bus slaves 11, 12 and 13 and bus master 10, said pins being labeled CLK in FIG. 1. In embodiments of the present invention, one of these clock pins is a clock output outputting a clock signal, whereas the remaining clock pins are clock inputs receiving said clock signal such that bus master 10 and bus slaves 11, 12 and 13 receive the same clock signal. As will be explained in more detail in the following, the clock signal may be output by bus master 10 or by one of bus slaves 11, 12 and 13. In other embodiments, an external clock signal may be supplied to clock line 16.

Lines 14, 15 and 16 as shown each connect all the bus slaves with the bus master 10 and may be arranged in a star-like or in a linear topology.

In the embodiment of FIG. 1, the system further comprises lines 18, 19, 20, 21 and 22 connecting optional input/output pins labeled opt.IO of bus slaves 11, 12 and 13 and of bus master 10 with each other. Unlike lines 14-16, optional lines 18-22 are point-to-point connections each connecting only two pins with each other. Optional lines 18-22 merely serve as examples, and other additional lines may also be present in other embodiments. Some possible functions of such optional lines will be discussed with respect to further embodiments.

As already mentioned above, in embodiments of the invention, the clock signal on clock line 16 may be generated by one of the bus slaves or by the bus master. In the following, the entity generating the clock signal will be designated clock master, while the remaining entities receiving the clock signal from the clock master will be designated clock slaves. These possibilities will be further explained with respect to a second embodiment shown in FIG. 2 and a third embodiment shown in FIG. 3.

Figure 2:
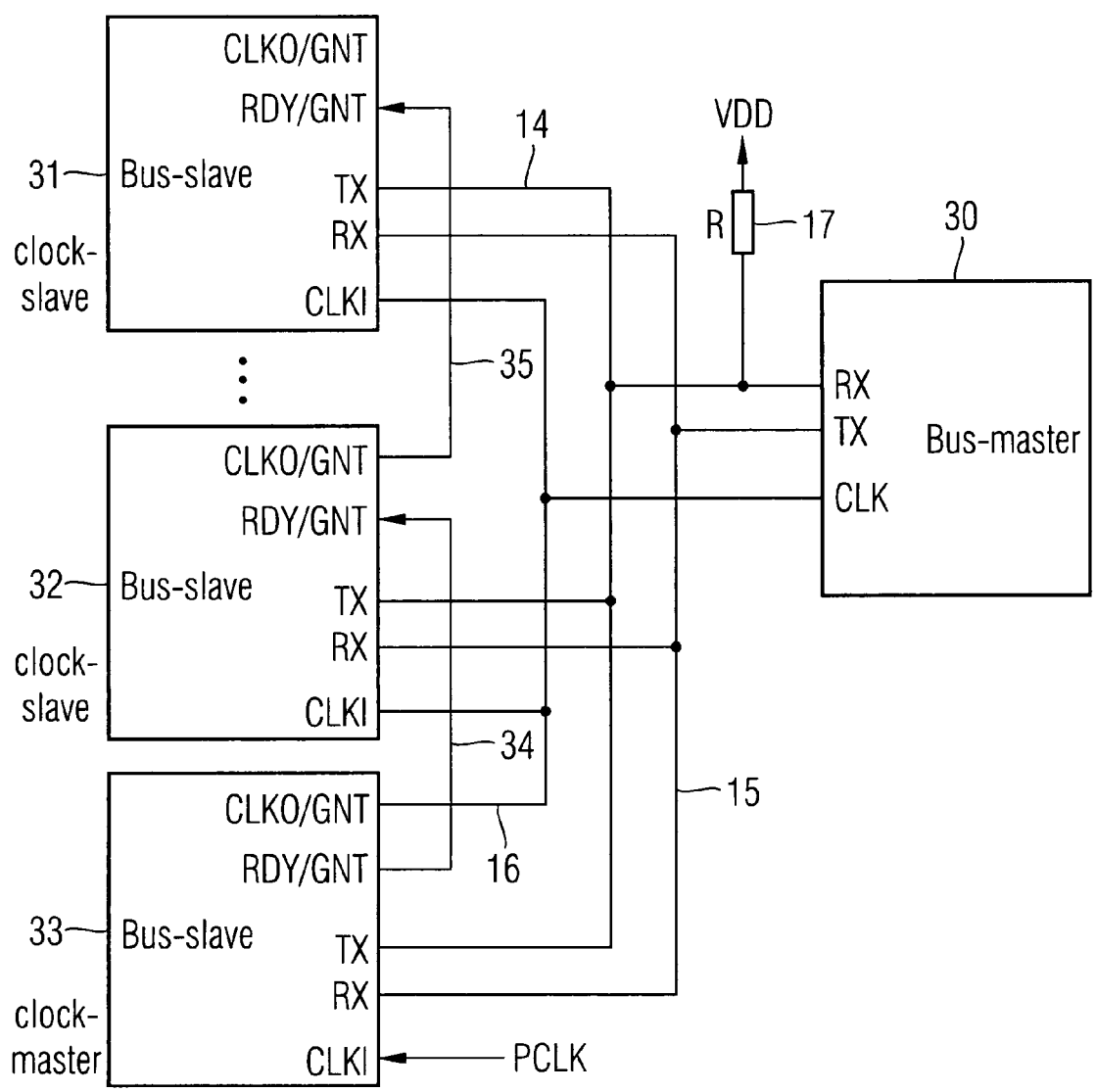
FIG. 2 shows a second embodiment of a bus system.

In the second embodiment of FIG. 2, a bus master 30 is coupled with bus slaves 31, 32 and 33 in a similar manner as in the first embodiment of FIG. 1. In particular, the bus according to the second embodiment comprises a first data line 14, a second data line 15 and a clock line 16, wherein connection and function of first data line 14 and second data line 15 are similar to the first embodiment of FIG. 1. Also the function of clock line 16 is similar to the one of the embodiment of FIG. 1, but the connection thereof is shown in more detail.

In particular, in the embodiment of FIG. 2, bus slave 33 serves as clock master, i.e., bus slave 33 supplies the clock signal to clock line 16 via its clock output CLKO/GNT. This clock signal may, in an embodiment, be generated by an internal phase locked loop of bus slave 33 using a reference clock signal PCLK supplied to a clock input CLKI of bus slave 33. Reference clock signal PCLK in turn may for example be generated by a quartz oscillator or any other means.

Clock line 16 is furthermore connected to clock inputs CLKI of bus slaves 31 and 32 and to clock pin CLK of bus master 30 also serving as clock input in the embodiment of FIG. 2, such that bus slaves 31 and 32 and also bus master 30 are supplied with the clock signal output by bus slave 33, i.e., are clock slaves.

Furthermore, in the embodiment of FIG. 2 two optional lines 34 and 35 similar to lines 19 and 21 of FIG. 1 are present. Line 34 connects a RDY/GNT (ready/grant) input/output pin with a corresponding input/output pin of bus slave 32, and line 35 connects a CLKO/GNT pin also serving as output pin in this case with a RDY/GNT pin of bus slave 31 such that lines 34 and 35 connect bus slaves 31-33 in a daisy-chain-like manner. This concept may also be extended to more than three bus slaves. Lines 34 and 35 in embodiments of the invention are used for initializing the bus system as will be explained later in more detail.

In the embodiment of FIG. 2, bus slaves 31-33 as explained above have pins which may serve more than one function. For example, in bus slave 33 the CLKO/GNT pin serves for outputting the clock signal on clock line 16, whereas in bus slave 32 it serves for sending a signal via line 35 to RDY/GNT pin of bus slave 31. On the other hand, in bus slave 33 the RDY/GNT pin serves as output for sending a signal via line 34 to bus slave 32, whereas in bus slave 31 and 32 said pin serves as input. In other embodiments, these functions of the pins may be separated, for example by providing a clock output pin, a pin for sending information to another clock slave and a pin for receiving information from another clock slave. Further pins for further purposes may also be present in embodiments of the present invention.

Figure 3:
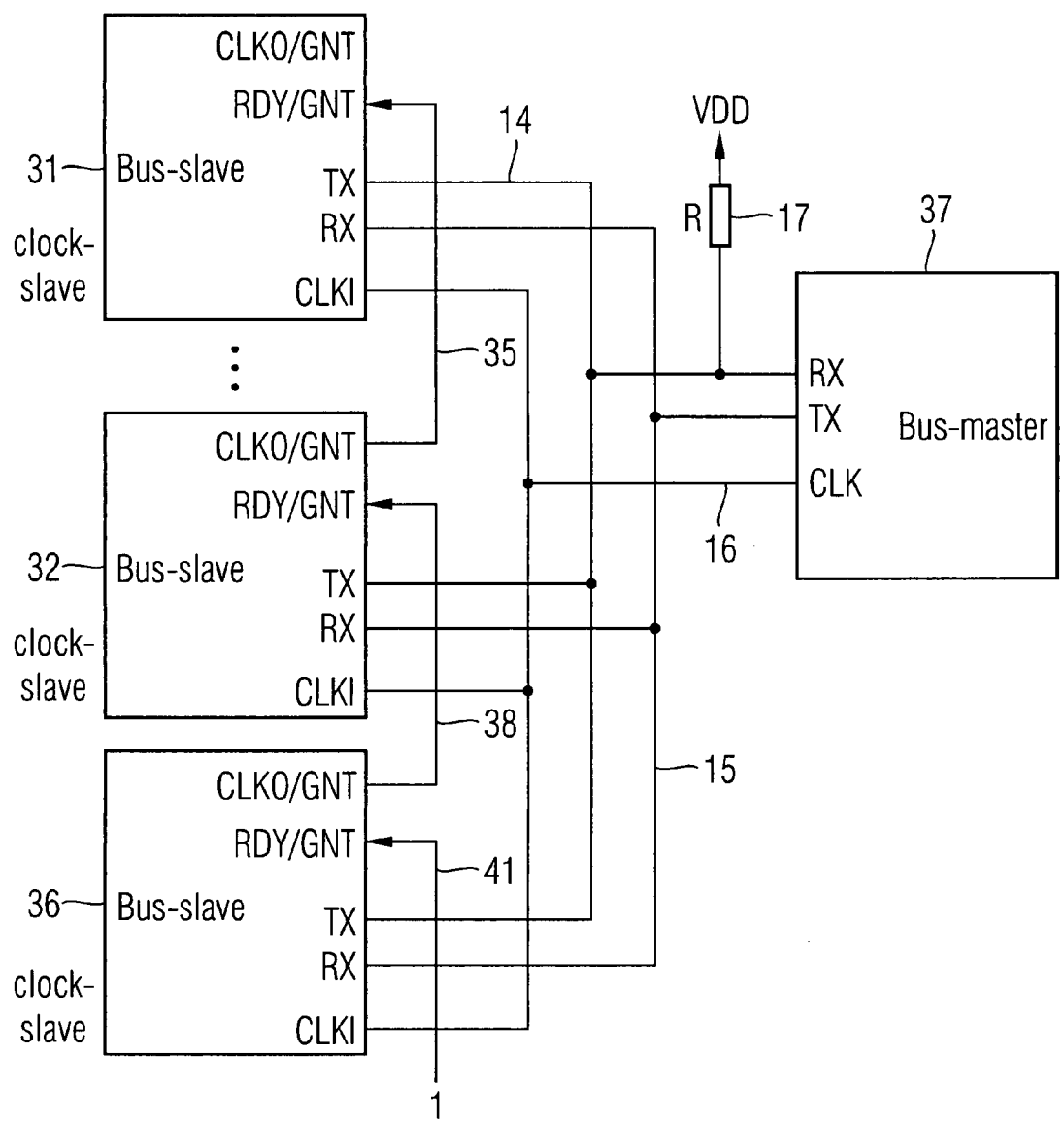
FIG. 3 shows a third embodiment of a bus system.

A third embodiment shown in FIG. 3 shows a system where the clock signal is generated by bus master 37 which otherwise is similar to bus master 30 or bus master 10 of FIGS. 2 and 1, respectively. The clock signal is output on a pin labeled CLK to a clock line 16 and transmitted via clock line 16 to clock inputs labeled CLKI of bus slaves 31, 32 and 36. The bus of the embodiment of FIG. 3 further comprises a first data line 14 and a second data line 15 which are employed in the same manner as in the embodiment of FIGS. 1 and 2.

Somewhat similar to the embodiment of FIG. 2, bus slaves 31, 32 and 36 are connected in a daisy chain. In the embodiment of FIG. 3, a logic 1 is set via a line 41 to a RDY/GNT pin of bus slave 36, a CLKO/GNT pin of bus slave 36 is coupled via a line 38 with RDY/GNT pin of bus slave 32, and CLKO/GNT pin of bus slave 32 is coupled via a line 35 with RDY/GNT pin of bus slave 31. Again, lines 35, 38 and 41 are used in an embodiment during the initialization of the system which will be described later.

As already explained with respect to FIG. 1, the number of bus slaves is not limited to three as shown in FIGS. 2 and 3, but any number of bus slaves may be present. For the configuration of FIG. 2 where a bus slave is clock master, embodiments are shown comprising one bus slave, two bus slaves and four bus slaves in FIGS. 4, 5 and 6, respectively. Similar variations may be performed with the embodiment of FIG. 3.

Figure 4:
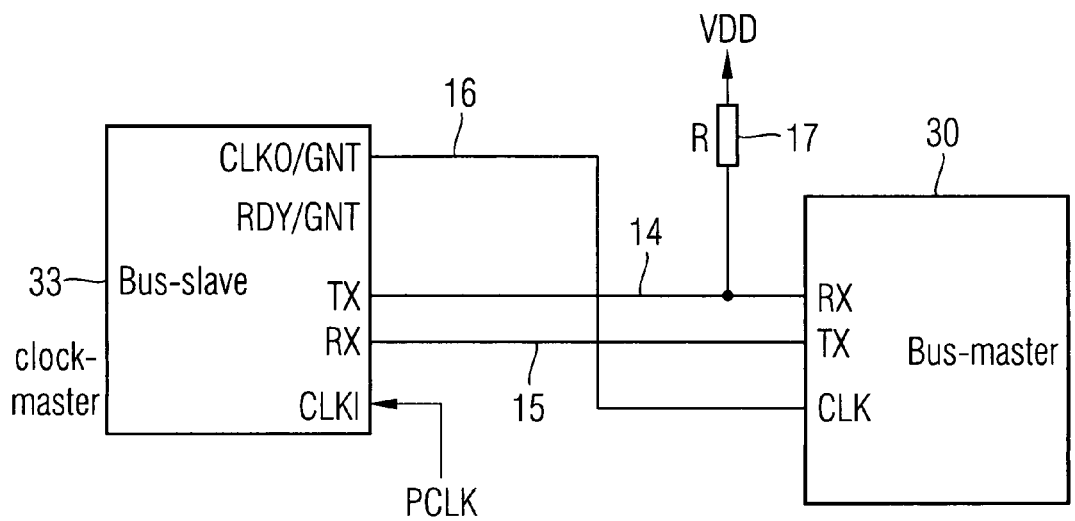
FIG. 4 shows a fourth embodiment of a bus system.
Figure 5:
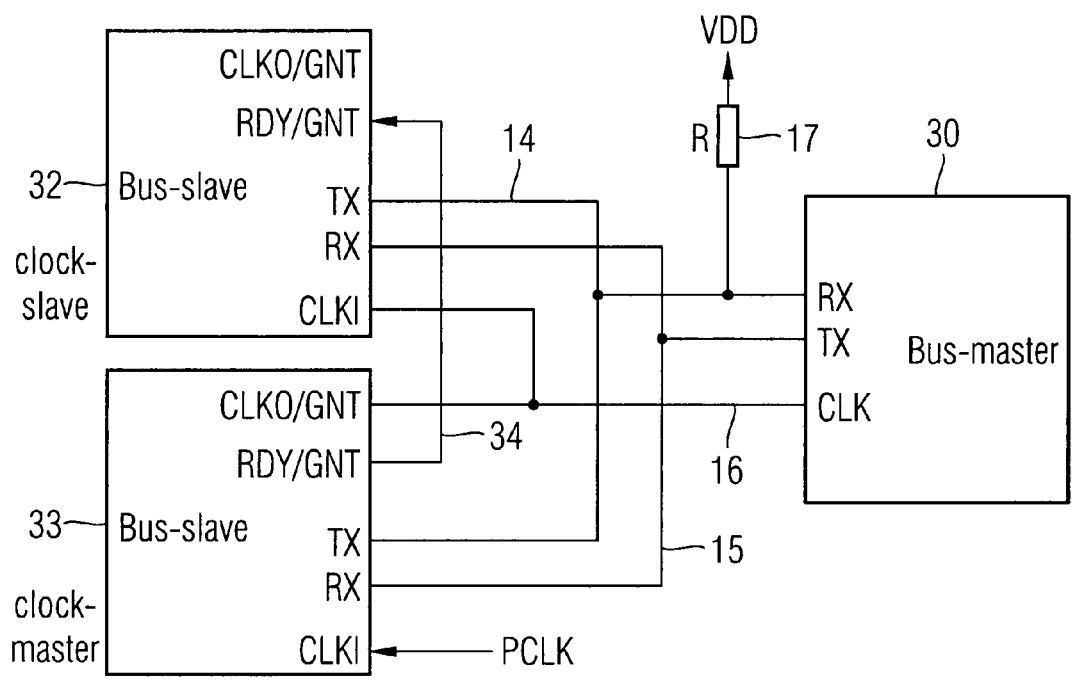
FIG. 5 shows a fifth embodiment of a bus system.

In particular, in the embodiment of FIG. 4 a single bus slave 33 serving as clock master similar to bus slave 33 of FIG. 2 is present. In FIG. 5, a bus slave 33 as clock master and a further bus slave 32 are present, such that bus slave 31 and the connections therewith have been omitted when compared to the situation of FIG. 2. Finally, in FIG. 6, when compared with FIG. 2 a fourth bus slave 39 which is also connected to first data line 14, second data line 15 and clock line 16 and a RDY/GNT pin of which is coupled via a line 40 with a CLKO/GNT pin of bus slave 31 is provided. Otherwise, the embodiments of FIGS. 4, 5 and 6 correspond to the embodiment of FIG. 2. It is to be noted that in other embodiments the number of bus slaves present may be different than four.

Next, embodiments of a method for initializing a bus system, for example a bus system according to the embodiments of FIGS. 1-6, will be discussed with reference to FIGS. 7 and 8. The embodiments described provide mechanisms for assigning base addresses and delays to bus slaves of a bus system and for determining a clock master supplying a clock signal to the bus system. Other embodiments may implement only some of these functions.

Figure 6:
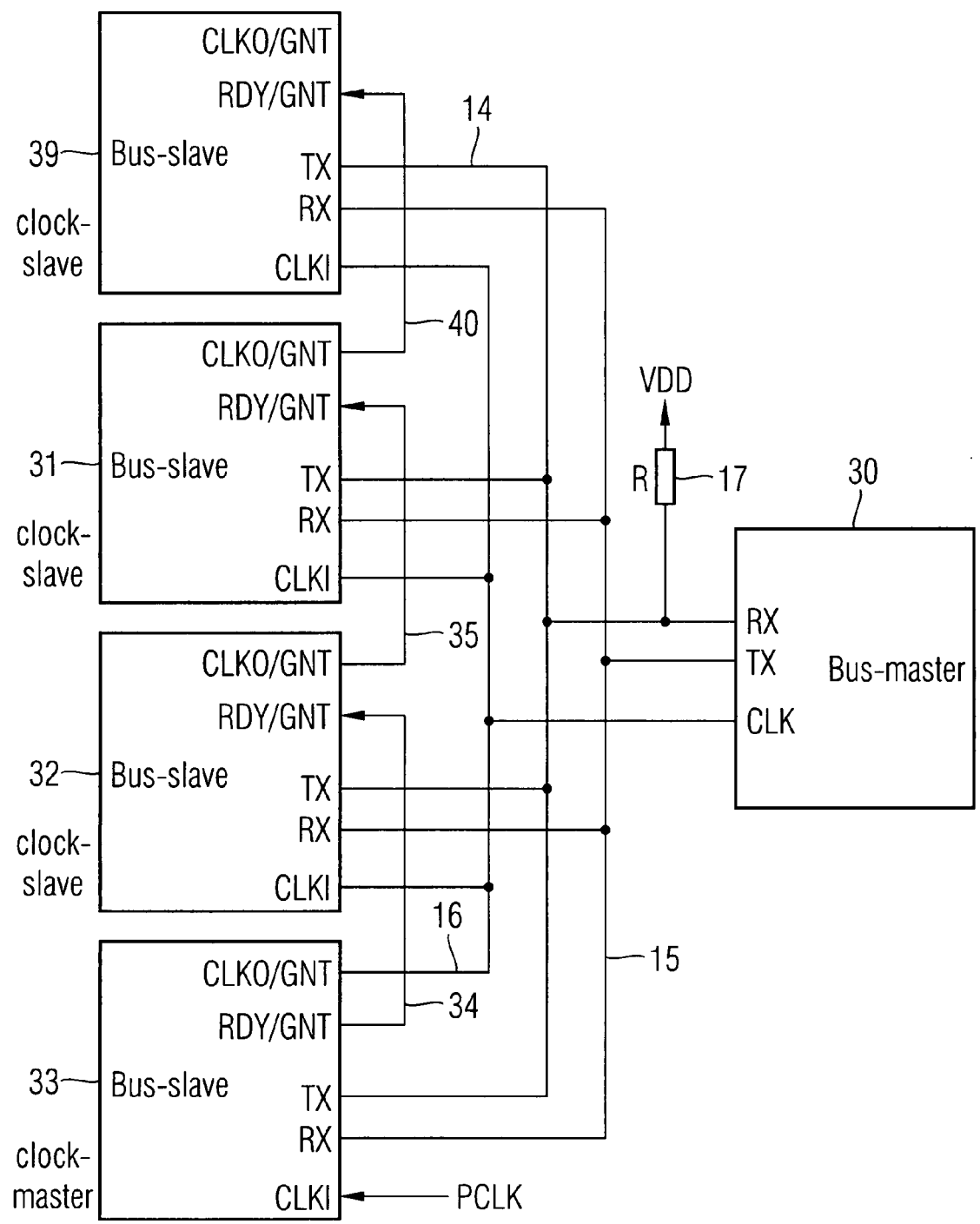
FIG. 6 shows a sixth embodiment of a bus system.
Figure 7:
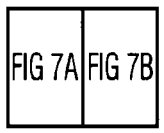
FIG. 7 shows flow diagrams of embodiments for initializing a bus system.
Figure 7A:
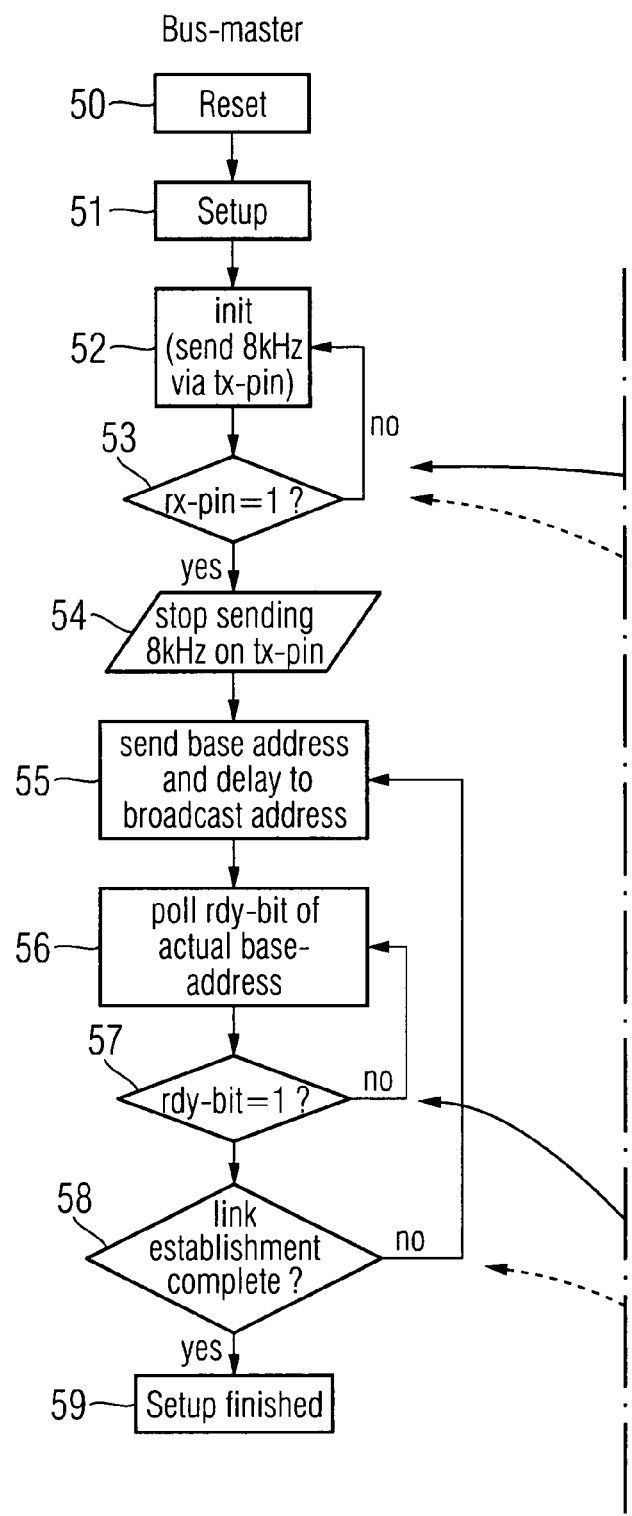
Figure 7B:
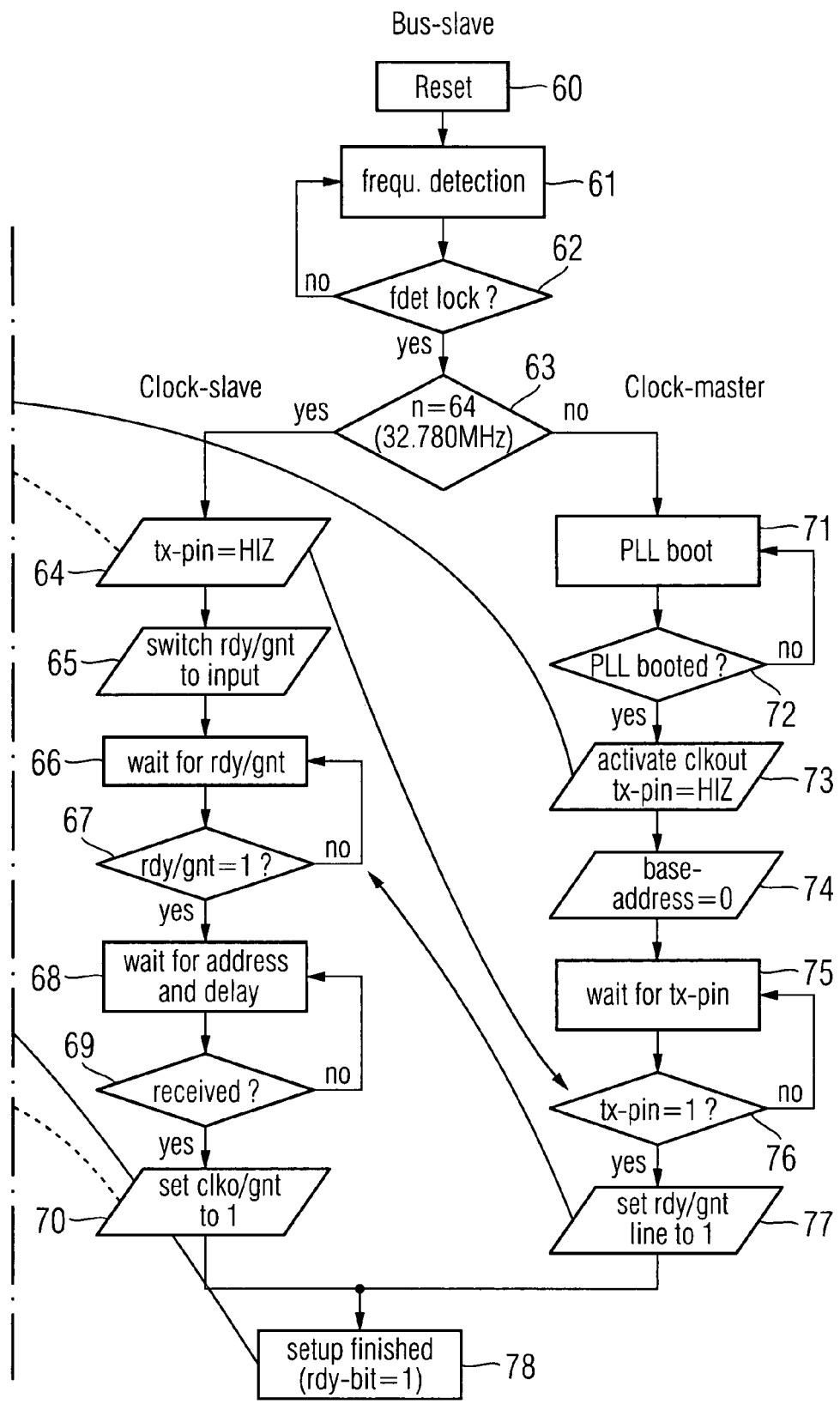

Turning now to FIG. 7, flow diagrams of embodiments of initialization routines are shown, wherein the routine shown on the left side of FIG. 7 (method steps 50-59) are executed in a bus master (for example bus master 10, 30, 37 of the embodiment of FIGS. 1-6), whereas the routine shown on the right side of FIG. 7 (method steps 60-78) are executed in the respective bus slaves (reference numerals 11-13, 31-33, 36 and 39 of the embodiments of FIGS. 1-6). As indicated by arrows in FIG. 7, these routines interact.

In the bus master, in step 50 a reset is performed to start the routine, which may be a reset when the system is turned on or a reset during operation.

In step 51, an internal setup is performed by the bus master, which in embodiments may comprise reading setup information from a storage. Also, if the bus master is clock master, the clock output is activated. In the embodiment discussed, a clock frequency of 32.768 MHz is used. However, in other embodiments other clock frequencies may be used as well. Furthermore, in other embodiments the activation of the clock output in case the bus master is clock master may be performed between steps 51 and 52 or simultaneously with step 52 or at some other convenient point.

In step 52, an 8 kHz signal is sent via a transmit pin of the bus master, which in the embodiments of FIGS. 1-6 is coupled to second data line 15. This 8 kHz signal as will be explained later when discussing the initialization routines of the bus slaves is used as a time normal in the bus slaves. As indicated by step 53, this sending of the 8 kHz signal is maintained until the receive pin of the bus master, which in the embodiment of FIGS. 1-6 is coupled to first data line 14, assumes a logic 1 corresponding, e.g. to a positive supply voltage. This logic 1 of the receive line in the embodiment shown indicates that clocking is established in all bus slaves. When this is the case, in step 54 the sending of the 8 kHz signal is terminated.

In step 55, a base address and a delay are sent to a broadcast address, i.e. sent to all bus slaves. As will be explained when discussing the routine on the slave side, one of the bus slaves recognizes this bus address and delay as its base address and delay, and after having received this information sets an internal bit designated RDY-bit (ready bit) to 1. Consequently, in step 56 the bus master reads ("polls") the ready bit of the current base address, i.e., the base address sent in step 55, and in step 57 waits until said ready bit assumes a logic 1 such that the bus master knows that this base address and delay have been correctly received.

In step 58 it is determined whether the link establishment is complete. If this is not the case, steps 55-57 are repeated with the next base address and possibly a different or the same delay to be assigned to the next bus slave. If the link establishment is complete, in step 59 the setup is finished, i.e. all base addresses and delays have been assigned to the bus slaves.

To determine whether the link establishment is complete, in different embodiments different methods may be used. For example, in an embodiment the number of bus slaves may be stored in the bus master such that the bus master knows how many times steps 55-57 have to be performed. In other embodiments, the last bus slaves to receive base address and delay, send a signal to the bus master to indicate that the link establishment is complete, for example, via the first data line 14, the second data line 15 or an optional line like line 22 in FIG. 1.

In still other embodiments, the link establishment is assumed to be complete when after a certain time still no ready bit of 1 is returned in step 57 indicating that no further bus slaves are present using the last base address sent in step 55.

Next, the corresponding routine for the bus slaves of the embodiments of FIG. 7 will be discussed. The routine starts in step 60 with a reset, which as in step 50 on the bus master side may be a reset at powerup of the system or a reset during operation of the system. With the reset, in the embodiment of FIG. 7, a transmit pin of the respective slave is set to 0, said transmit pin being coupled to the receive pin of the bus master via first data line 14 in the embodiments of FIGS. 1-6. A clock output of the bus slaves is also set to 0, said clock output corresponding to the pin labeled CLKO/GNT in the embodiments of FIGS. 2-6. Finally, in the embodiment of FIG. 7 also the RDY/GNT pin shown in the embodiments of FIGS. 2-6 is set to 0.

In step 61, a frequency detection of a frequency applied to the clock input of the bus slave (labeled CLKI in the embodiments of FIGS. 2-6) is performed until a lock, i.e., a stable frequency detection, is determined in step 62. An embodiment of this frequency detection will be explained later in detail with reference to FIG. 8. The frequency detection routine according to this embodiment yields a value n indicating the detected frequency in multiples of 512 kHz.

In step 63 it is determined if this variable n equals 64 indicating a frequency of 32.768 MHz which, as already explained, is in the embodiment shown as the operating frequency of the system. In case a different operating frequency is used for the system in a different embodiment, it is determined in step 63 if this different frequency is present.

The presence of said frequency of 32.768 MHz indicates that this frequency is generated by another entity in the bus system or, in other words, that another entity is clock master and therefore the bus slave on which the routine of FIG. 7 runs is clock slave. In this case, the routine continues with step 64. On the other hand, if no such frequency is present, no other clock master exists and therefore the bus slave on which the routine is executed is clock master. In this case, the routine is continued with step 71.

Next, the portion of the diagram of FIG. 7 starting with step 64, i.e., the case when the bus slave is clock slave, will be discussed.

In step 64, the transmit pin of the bus slave which is connected to first data line 14 in the embodiments of FIGS. 1-6 is "released", i.e., no longer set to 0 as performed in step 60 explained above. When all bus slaves "release" their transmit pin, or in other words no bus slave sets the transmit pin to 0, the corresponding line is, in the embodiments of FIGS. 1-6, pulled to a high state or logic 1 via pullup resistor 17 and thus set to 1 which then, as already explained with respect to step 53, indicates to the bus master that clocking is established for all bus slaves. Pullup resistor 17 may be arranged externally at the system board or in any one of bus master 10 and bus slaves 11-13.

In step 65, the RDY/GNT pin is set to input, which relates to the embodiment of FIGS. 2 and 6 where said pin of the bus slave is shown. As shown in FIGS. 2-6, the bus slaves are connected in a daisy chain using the RDY/GNT pin as input for all bus slaves which are also clock slaves. According to the embodiment of FIG. 7, a logic 1 on the RDY/GNT pin indicates to the bus slave that the next address and delay sent to the broadcast address in step 55 are intended for it. Therefore, in steps 66 and 67 a loop is performed waiting for the signal at the RDY/GNT pin to become 1.

When the RDY/GNT pin assumes a 1, in steps 68 and 69 a further wait loop is performed until address and delay are received via the broadcast address (see step 55). When address and delay are received, these are stored in the bus slave. Finally, in step 70 the CLKO/GNT pin of the bus slave is set to 1 before in step 78 the setup is finished and the internal ready bit of the bus slave is set to 1 such that, in step 57, the bus master may detect that the setup for this bus slave is finished.

The procedure implemented by steps 66-70 of the embodiment of FIG. 7 will be further explained with reference to the embodiment shown in FIG. 3 where all the bus slaves are clock slaves. In this case, as can be seen in FIG. 3, the RDY/GNT pin of bus slave 36 is fed a logic 1. When bus master 37 therefore sends a base address and delay to the broadcast address for the first time (step 55 in FIG. 7), bus slave 36 has a 1 at its RDY/GNT pin, whereas the remaining bus slaves have a 0 at their RDY/GNT pin. Consequently, bus slave 36 knows that the base address and delay sent are intended for it and stores this base address and delay. Subsequently, according to step 70 bus slave 36 sets its CLKO/GNT pin to 1 which in turn sets, via line 38, the RDY/GNT pin of bus slave 32 to 1. Therefore, bus slave 32 knows that the next base address and delay broadcast by the bus master are its base address and delay. Again, in step 70 this bus slave 32 sets its CLKO/GNT pin to 1 after having received its address and delay therefore setting the RDY/GNT pin of bus slave 31 to 1 indicating to bus slave 31 that the next base address is intended for it. In other words, seen in FIG. 3 the base addresses and delay are assigned from the bottommost slave depicted in FIG. 3 to the topmost bus slave depicted in FIG. 3. Of course, this schematic representation does not imply any actual order of the placement of the bus slave on a circuit board or in an electronic circuit.

The same procedure essentially is carried out in the embodiments of FIGS. 2, 5 and 6 for the bus slaves except for bus slave 33 which is clock master according to the embodiment shown. The procedure performed in the clock master will next be described again referring to FIG. 7.

When in step 63 it is determined that the bus slave is clock master, in step 78 an internal phase locked loop (PLL) of the clock master is booted, said PLL being provided in the embodiment discussed to generate the clock signal of 32.768

MHz from a reference clock signal like the signal PCLK of FIGS. 2, 4, 5 and 6. When it has been ensured that the PLL is booted, i.e., in a stable state, in step 73 the clock output is activated, i.e., the generated clock signal is output at a clock output pin of the bus slave (in the embodiments of FIGS. 2, 4-6 pin CLKO/GNT) to the clock line of the bus, e.g., clock line 16 in the embodiments of FIGS. 1-6. Furthermore, the transmit pin is released, i.e., no longer set to 0, as in step 64 for the case of the clock slave to indicate that clocking at the bus slave, in this case the clock master, is established.

In step 74, a base address of 0 and a predetermined delay is assigned to the bus slave being clock master in the embodiment shown. In other embodiments, a base address different from 0 may be given to the bus slaves. In yet other embodiments, the clock master uses the first base address and delay broadcast by the bus master in step 55.

In steps 75 and 76 a wait for the transmit pin to assume a value of 1 is performed which corresponds to the wait of step 53 (the transmit pin of the bus slaves are coupled to the receive pin of the bus master, for example via first data line 14 of the embodiments of FIGS. 1-6). As in the case of step 53, the transmit line assuming a value of 1 indicates to the clock master that clocking is established in all bus slaves.

Then, in step 77 the RDY/GNT pin of the bus slave is set to 1 which in this case serves as an output which is connected with the RDY/GNT pin of the "next" bus slave as can be seen in FIGS. 2 and 4-6 and therefore, similar to step 70, indicates to the next bus slaves that the next address and delay broadcast are intended for it.

As in the case of the bus slave being clock slave, in step 78 the setup is finished and the internal ready bit is set to 1.

With the embodiment shown in FIG. 7, any bus slave or the bus master may be clock master. Base addresses and delays are assigned to all bus slaves by the bus master. In other embodiments, it may be predetermined which entity is clock master, for example by external signaling, such that the procedure for detecting whether a bus slave is clock slave or clock master (steps 61-63) may be omitted. In other embodiments, fixed base addresses and delays may be assigned to the bus slave so that the corresponding steps for assigning the base addresses and delays may be omitted and only the clock establishing is performed.

Next, an embodiment for the frequency detection step 61 of FIG. 7 will be discussed with reference to FIG. 8.

In step 80 after the slave running the procedure is reset an internal signal rstq_fdet is set to active. As soon as this signal is released, which is determined in step 81, the actual procedure for frequency determination is started. This release may be provided for example in a startup procedure of the slave.

In step 82, the slave is idle, i.e., waits, until in step 83 an edge, for in the present embodiment a rising edge of the 8 kHz signal supplied by the bus master (see step 52 of FIG. 7) on a receive pin of the bus slave is detected. As soon as this is the case, during a first measurement period in step 84 the number of pulses, for example the number of rising edges, of a signal supplied to a clock input of the bus slave is counted until in step 85 the next rising edge of the 8 kHz signal is detected. When this is the case, the number counted is stored in a variable which may be named pcl_count_first, and during a second period again the number of pulses of a signal at the clock input is counted in step 86 until the next rising edge of the 8 kHz signal is detected in step 87. The number of pulses counted during the second period is named pcl_count_second.

In step 88, it is evaluated whether the two counts determined during the first period in step 84 and the second period in step 86 are equal, i.e. if pcl_count_first=pcl_count_second.

If this is the case, in step 89 it is assumed that a stable clock signal is present at the clock input, whereas in the case of disparity of the two values it is determined that no stable signal is present and therefore the procedure is resumed at step 82 in order to try anew to detect a stable signal.

In step 90, it is then evaluated whether the value pcl_count_first (which is equal to the value pcl_count_second) equals n×64 with a predetermined certainty, in the embodiment with a exactness of ±3. n in the embodiment shown may be chosen from 1-16, 32 or 64.

As already mentioned, a value of n=64 means in the embodiment discussed that a clock signal with the predetermined clock rate of the system, i.e., 32.768 MHz, has been detected, since 64×64×8 kHz=32.768 MHz. In this case, later on in step 63 of FIG. 7 this is taken as an indication that the bus slave is clock slave. A different one of the possible values of n, in the embodiment shown 1-16 or 32, is taken as an indication that a reference clock signal like the signal PLCK of the embodiments of FIGS. 2 and 4-6 is applied to the clock input of the bus slaves to be used for generating the clock signal, i.e., in this case the bus slave is clock master. In the embodiment shown in FIG. 8, reference clock signals with frequencies of 1 to 16 or 32×512 kHz would be accepted, since in this case values of n from 1 to 16 or 32 would result. If a signal with a frequency different from this is detected, this is not regarded as a valid reference signal or clock signal and therefore the process is resumed at step 82. The values given as an example in FIG. 8 may be different in embodiments using clock signals and reference clock signals having different frequencies. Moreover, if in an embodiment only a reference clock of 512 kHz would be acceptable, the values of n permitted in step 90 could be reduced to 1 for a reference clock signal or 64 for the clock signal.

Figure 8:
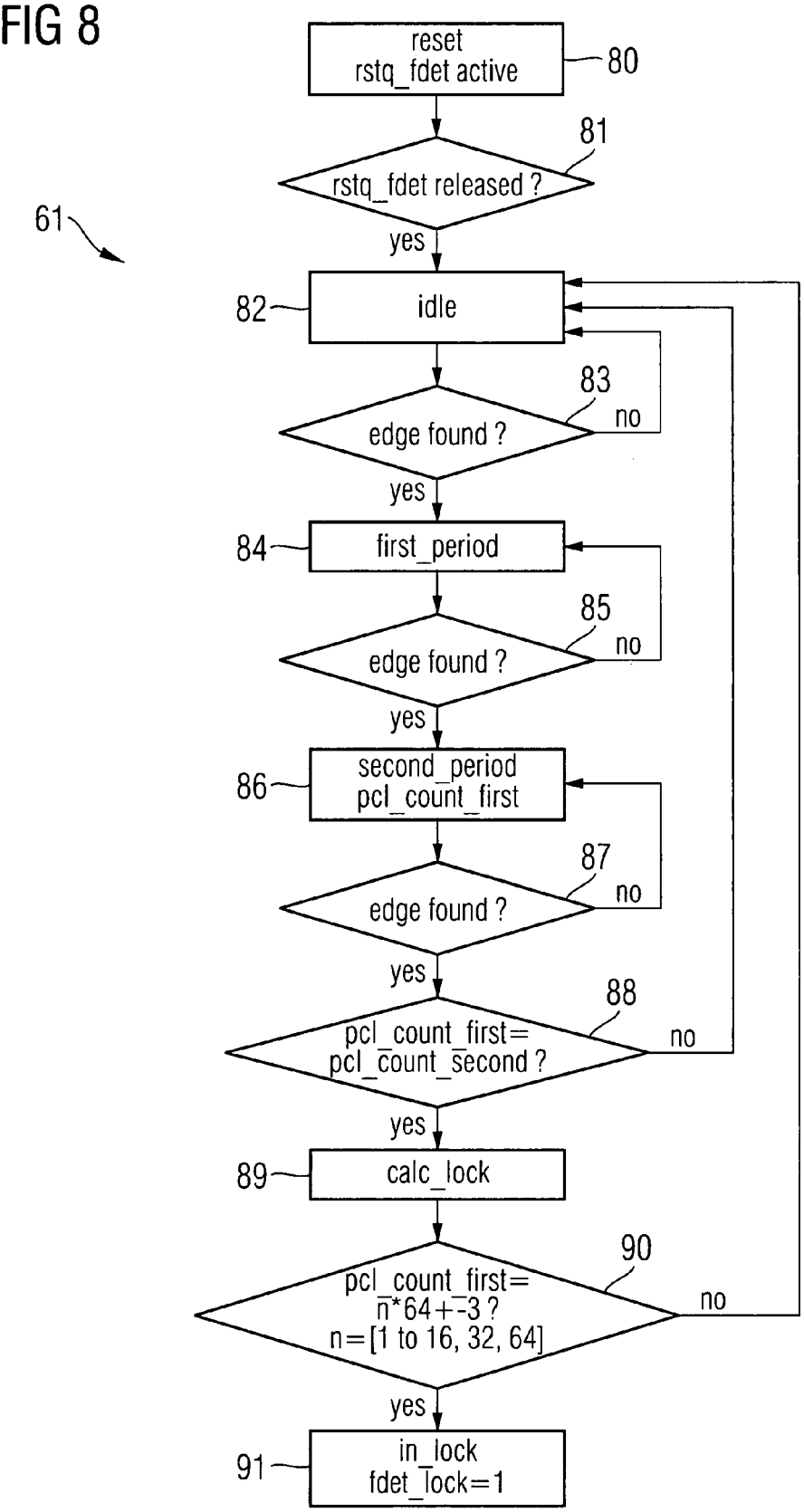
FIG. 8 shows a flow diagram of an embodiment for frequency detection in FIG. 7.

The margin value which is ±3 in the embodiment of FIG. 8 may be used for taking into account that the frequency of 8 kHz of the signal generated by the bus master need not have a very high precision regarding the exact frequency. The margin value may be adapted to the frequency accuracy of said 8 kHz signal or any other signal used as reference for determining the frequency of the clock signal.

If a permitted value of n resulted in step 90, in step 91 the frequency detection is terminated, and the variable f_lock which is evaluated in step 62 of FIG. 7 is set to 1. Furthermore, the value of n determined in case of the bus slave being clock master may be used to adjust an internal frequency divider of the PLL of the clock master in order to generate the desired clock frequency from the frequency of the reference signal supplied.

The frequency detection mechanism of FIG. 8 is to be taken only as an example, and other mechanisms for determining the frequency of a signal applied to the clock input of the bus slaves may be employed as well in other embodiments.

After the system has been initialized and the clocking, addresses and delays are established, i.e., the link establishment is complete, the system is ready for communication. Embodiments of a protocol for communicating over a bus, for example, the bus of the embodiments of FIGS. 1-6, will be described next.

Figure 9:
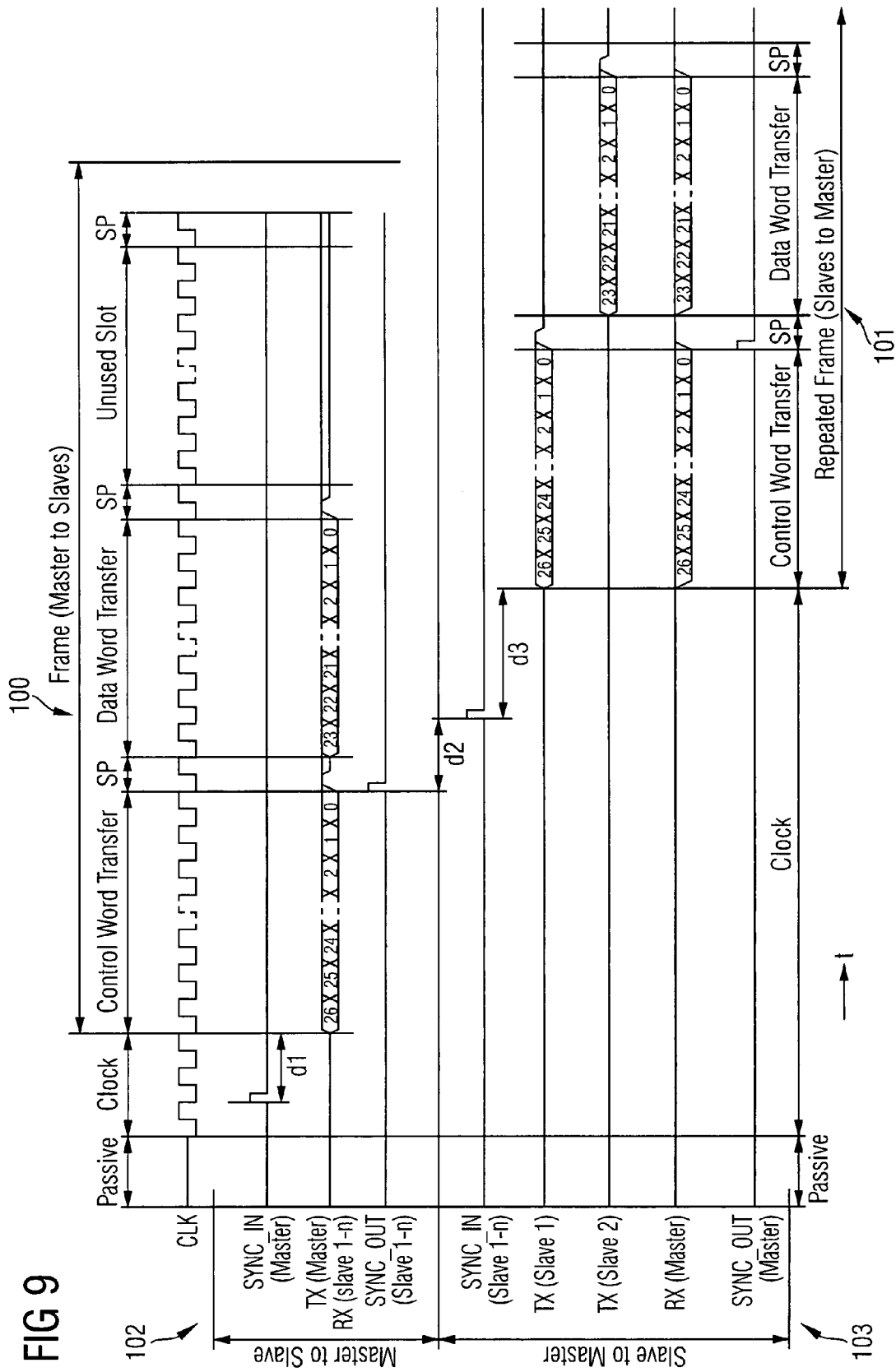
FIG. 9 shows a timing diagram of an embodiment of communication in a bus system.

In FIG. 9, a timing diagram showing some basic properties of the communication according to an embodiment of a protocol are shown. This embodiment then will be further elaborated with reference to FIGS. 10-20.

At a top part of FIG. 9, a clock signal CLK is shown which, in the embodiments of FIGS. 1-6, is present on clock line 16. In a section bearing reference numeral 102, the communication from the bus master to the bus slave is schematically shown, which in the embodiments of FIGS. 1-6 takes place over second data line 15. Finally, in section labeled 103, the communication from bus slaves to a bus master is schematically shown, which in the embodiments of FIGS. 1-6 takes place over first data line 14.

In the timing diagram of FIG. 9, communication is preceded by a section labeled "passive" in which no signal is present on the bus lines. This situation in the embodiments previously discussed for example corresponds to the situation before link establishment and clocking establishment.

After the section labeled passive, in a section labeled "clock" clocking is established, i.e., a clock signal CLK is present on a clock line of a bus (clock line 16 in the previously discussed embodiments). After the first full period of the clock signal, an internal signal SYNC_IN is generated in the bus master which is used as a reference point for the start of sending information via the bus.

In the embodiment discussed, information is sent in form of frames 100 from master to slave and in form frames 101 from slave to master. In the embodiment currently discussed, the bus master starts sending a frame 100 after a programmable delay time d1 has passed since the internal SYNC_IN signal as shown in FIG. 9. The frame 100 is sent on a line coupling a transmit (TX) pin of the master with receipt (RX) pins of the slaves, in the embodiments of FIGS. 1-6 second data line 15. The part of frame 100 depicted in FIG. 9 according to the embodiment comprises a control word having 27 bits separated by a stop bit SP from a data word having 24 bits which in turn is separated by a stop bit by an unused slot, i.e., a part where no data is sent. The control word is transferred during the period labeled "control word transfer", while the data word is transferred during the period labeled "data word transfer". More detailed embodiments of frame formats and control words will be discussed later.

In the embodiment shown, the individual bits of the data sent change with falling edges of the clock signal and are sampled in the corresponding receiving element (master or slave) at the rising edge of the clock signal, i.e., at least approximately in the middle of the respective bit.

The stop bits labeled SP in FIG. 9 in the embodiment shown are sent such that a logic 1 is sent only for the first half of the clock cycle corresponding to the stop bit, and then the line is released and thus pulled up or held at a logic 1 by a pull-up resistor like pull-up resistor 17 in FIGS. 1-6. This stop bit may, in embodiments of the invention, be generated by an entity other than an entity responsible for the generation of the control word or data word bits.

The stop bit as indicated in the line labeled SYNC_OUT (Slave 1-$n$) also serves as an internal synchronization signal for the slaves. Due to delays based on the processing of the received signal in the slaves, this synchronization signal is present as an internal synchronization signal SYNC_IN of the slave as depicted in section 103 of FIG. 9 after an integration delay d2. This integration delay in the embodiment shown is hardware dependent.

A respective bus slave then starts transmission after a programmable delay labeled d3 for slaves 1 in FIG. 9 has passed since this internal synchronization signal SYNC_IN(Slave 1-$n$). The programmable delay d3 in an embodiment may in particular be the delay assigned to the respective slaves in the embodiment of FIG. 7. In an embodiment, the programmable delay d3 is chosen such that the sum of programmable delay d3 and integration delay d2 corresponds to a predetermined value. In the embodiment shown, the slaves send back a frame 101 which comprises the control word sent by the master and a data word which depending on the control word may correspond to the data word transferred from the master to the slaves in frame 100 or may contain data responding to a command in the control word. Also in the frame 101 sent back, the control word is separated from the data word by a stop bit. Therefore, confirmation as indicated in the line RX(Master) receives back a frame in the same format as confirmation.

In the exemplary embodiment shown in FIG. 9, the control word is sent back by a first slave and the data word is returned by a second slave. This in particular depends on how the data words and control words are assigned to the respective slaves using the base addresses of the slave assigned to the slaves, in an embodiment, with the procedure explained with reference to FIG. 7.

Again, the stop bit serves as a synchronization output to the master as indicated in the line SYNC_OUT(Master).

Next, embodiments of formats for frames and commands used within frames will be discussed with reference to FIGS. 10-20.

Figure 10:
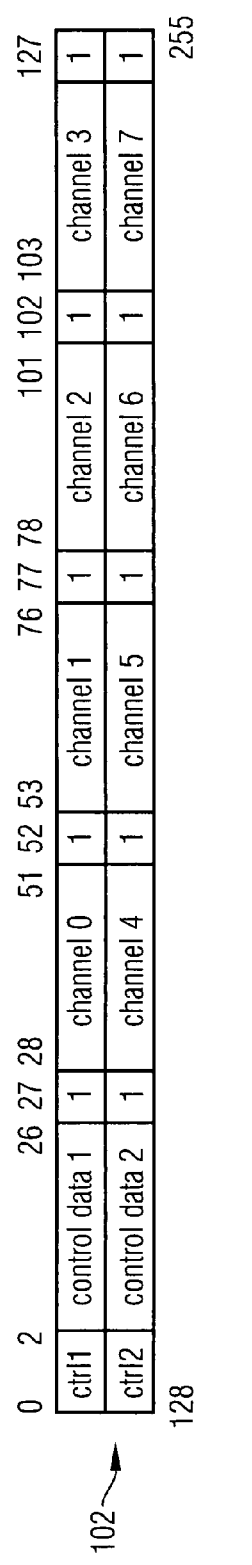
FIG. 10 shows an embodiment of a data format for use in a bus system.

FIG. 10 shows in a section 102 a frame according to an embodiment comprising 256 bits which, with a clock frequency of 32.768 MHz as mentioned above may be transmitted with a frequency of 128 kHz. The frame is depicted in two lines for greater clarity, this however does not imply that the frame is sent over two different lines or the like. In the embodiment shown, the section labeled ctrl2 follows the stop bit labeled 1 of the section labeled "channel 3". Over the different sections, the bit numbers are given. The bits numbers 128 and 255 of the part of the frame depicted in the second line are additionally given below the frame.

Bits 0-26 of the frame correspond to the control word of FIG. 9, wherein bits 0-2 serve as a control for the physical layer for example by giving a channel, i.e., a base address of the slave for which the following control data of bits 3-26 is intended. After this control data labeled control data 1 in FIG. 10 24-bit data follows for channels 0, 1, 2 and 3, each separated by stop bits bearing numbers 27, 52, 77 and 102 in FIG. 10. The channel numbers correspond to the addresses of bus slaves, such that the data transmitted in channel 0 would be intended for the bus slave having a base address of 0, channel 1 for the bus slave having a base address of 1, etc. In other words, the frame corresponds to a time division multiplex method for transmitting data wherein the total time on the bus is split between various channels corresponding to various bus slaves. In the second half of the frame, the sequence of the first half is basically repeated starting with a second control word (bits 128-154) again comprising three bits for channel designation and the like labeled ctrl2 followed by 23 control data bits labeled control data 2. After that, 24-bit data for channels 4-7 follows again separated by stop bits. As can be seen, with the embodiment of a frame shown in FIG. 10, eight channels may be used. As a matter of course, if a smaller or greater number of slaves is present on the bus, the format may be modified in other embodiments to accommodate more or less channels.

The format of the frame sent back from the slaves to the master shown in section 103 in FIG. 10 corresponds to the format of the frame sent from the master to the slaves in section 102 as already explained with reference to FIG. 9.

It should be noted that with such a frame as depicted in FIG. 10 which will be named 128 kHz frame in the following because of the repetition rate. In the currently discussed embodiment, data is sent to eight channels. On the other hand, only two sets of control data are provided and therefore, more than one frame is needed to supply all channels with corresponding control data. In other words, the data labeled channel 0 to channel 7 is sent to the slaves with a higher bandwidth than the data labeled control data 1 and control data 2. This will be explained later in more detail with reference to FIGS. 20A-20C.

Figure 11:
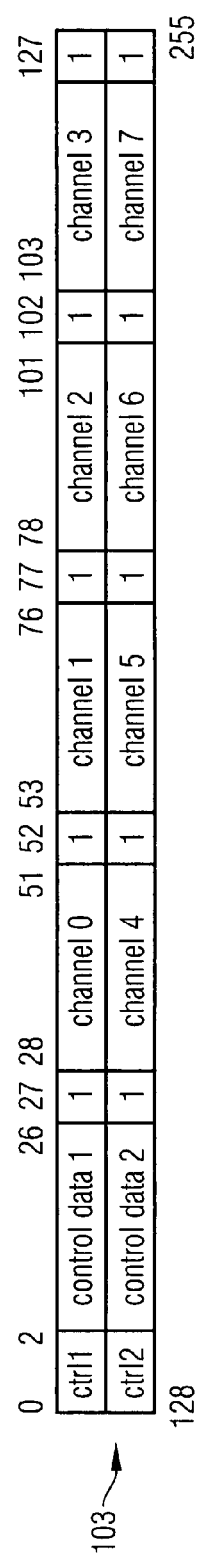

FIG. 11 shows an embodiment for a reset signal to all slave devices. In the embodiment shown, in order to reset all bus slaves the bus master sends a series of 0, in the embodiment shown 512 zeroes or more. In other words, two successive frames like the ones in FIG. 10 are sent filled with zeroes according to this embodiment.

Figure 12:
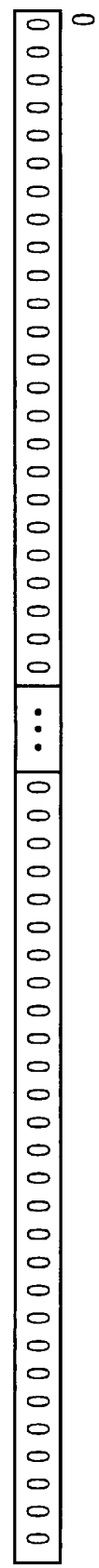

FIG. 12 shows the situation when the bus is idle or inactive. Since, as already explained, when no signals are applied to the data lines of the bus by the bus master or the bus slaves the voltage on the line is pulled to VDD representing logic 1 via pull-up resistors such that the idle state corresponds to a series of ones.

In FIG. 13 an embodiment of a sequence for frame synchronization is shown. Frame synchronization indicates to the slaves the beginning and ending of frames like the one shown in FIG. 10. The two sequences as shown in FIG. 13 are sent in a frame as ctrl1, control data 1, ctrl2 and control data 2 in case of the frame format of FIG. 10. In this case, in the sequence on the left side 27 zeroes are sent indicating a synchronization, and in the sequence depicted on the right in FIG. 13 a channel number is indicated in bits 0-2 (corresponding to ctrl2), whereas the remaining bits are partially filled with ones and partially filled with zeroes as shown. In this embodiment, the bus slave indicated by the channel number given sends back a corresponding synchronization word to the bus master guaranteeing that only one slave at a time sends this synchronization word which in an embodiment is done in a round-robin fashion. In an embodiment, such a synchronization signal is sent at least once every 125 μs corresponding to an 8 kHz period.

FIG. 14 shows an embodiment for a configuration sequence. As ctrl1 and control data 1 again a sequence of 27 zeroes is sent such that a frame synchronization may be performed also with this sequence. In the part depicted on the right of FIG. 14 assigned to ctrl2 and control data 2 in the frame format of FIG. 10 a channel number and a delay are broadcast, wherein for the channel number bits 0-2 and for the delay bits 3-11 are used. Bits 23-12 differ from the situation of FIG. 13 such that the slaves are able to distinguish the synchronization signal of FIG. 13 from the configuration signal of FIG. 14 irrespective of the delay assigned. In this respect, also other codes may be used for the bits 12-26 in other embodiments.

A sequence as shown in FIG. 14 in an embodiment is used in step 55 of FIG. 7 such that the bus slave the RDY/GNT pin of which has been set to 1 last is assigned the channel number and delay comprised in the sequence.

In FIG. 15, an embodiment of a sequence for power down is shown. The first part of the sequence shown on the left side in FIG. 15 corresponds to the sequence of FIG. 13, whereas the right part has a different bit sequence indicating that a power down is sent. All slaves when receiving this sequence perform a shut down routine. For example, if the respective receiving entity or bus slave is clock master, it shuts down the clock after receiving the echo, i.e., the acknowledgement that the command was received. If the receiver is responsible for synchronization of the bus system (for example the bus master), in an embodiment it connects the receive pin to the transmit pin and activates an internal clock activity detection such that it performs the necessary step when the clock again is activated. If the receiver is a "normal" bus slave, i.e. not a clock master or the like, in an embodiment it connects asynchronous events to its transmit pin to assume its powered down state.

In FIG. 16, an embodiment of a sequence for submitting other control data to a certain slave is shown. Prior to control data 1 in the field ctrl 1 of the frame shown in FIG. 10 the channel, i.e. the address of the corresponding slave is given in three bits. The data ctrl2 is set to 110. Control data 1 and control data 2 is then processed in the respective slave designated by the channel in a higher layer (e.g. a logic layer).

It should be noted that in FIGS. 13-16, the bit numbering is started at 26 and ends at 0, wherein bits 26-24 correspond to bits 0-2 or bits 128-130 in FIG. 10.

Figure 17:
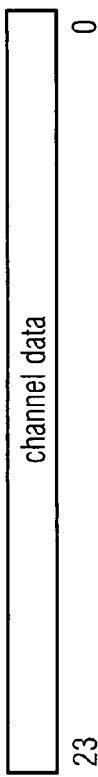

In FIG. 17, the channel data format used in the sections "channel 0" to "channel 7" in FIG. 10 is shown. 24 bits of data are sent in the embodiment shown.

Figure 18:
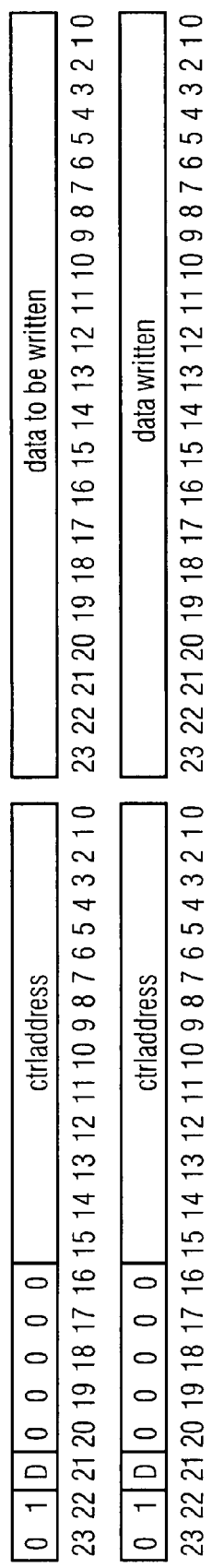
Figure 18:
Figure 19:
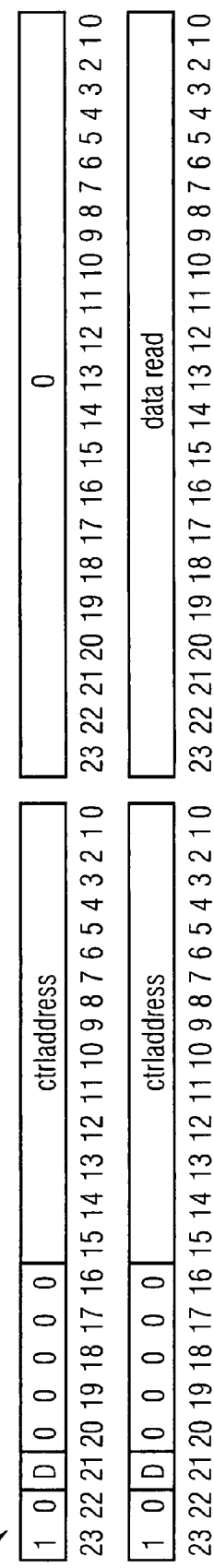
Figure 19:
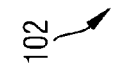

In FIGS. 18 and 19 embodiments for control data sent to a higher layer with the sequence of FIG. 16 are shown, wherein again the line labeled 102 shows control data 1 and control data 2 sent from master to slave and line labeled 103 shows the control data 1 and control data 2 returned from slave to master when the frame is repeated as explained with reference to FIGS. 9 and 10.

FIG. 18 shows an embodiment for writing data to a specified address, for example a register or the like, of the slave. The write command is characterized by the bit sequence 01 followed by 5 bits set to 0. Bits 15-0 of control data 1 designate the address to which the data is to be written, for example the address of a register. Control data 2 then comprises the data to be written.

In the return frame, control data 1 matches the one in the send frame, and in control data 2 the data actually written is stored. When no error occurs, the data to be written matches the data written returned by the slaves. Therefore, the returned frame may be used for detecting errors.

FIG. 19 shows an embodiment for a read operation corresponding to the write operation of FIG. 18. Control data 1 on the left side of FIG. 19 corresponds to the one of FIG. 18 with the exception that bits 23 and 22 have been reversed, i.e., the control data starts with 10 indicating a read operation. In the frame sent as indicated by reference numeral 102, control data 2 comprises only zeroes.

In the frame returned by the slave indicated by reference numeral 103, control data 1 is the same as sent by the master for confirmation, and control data 2 comprises the data read from the address indicated in control data 1.

As a matter of course, the embodiments shown in FIGS. 11-19 are to be taken as examples only, and other bit sequences may be used to characterize various commands and actions used for achieving the described functions on the bus in other embodiments.

With the embodiment shown and the frame format of FIG. 10, data and control information, for example synchronization information, may be sent over the same lines, in case of the embodiment of FIGS. 1-6 first data line 14 and second data line 15. Therefore, no additional synchronization or command lines are necessary in the bus, but the synchronization and command structure is embedded in the frames in this embodiment.

Figure 20A:
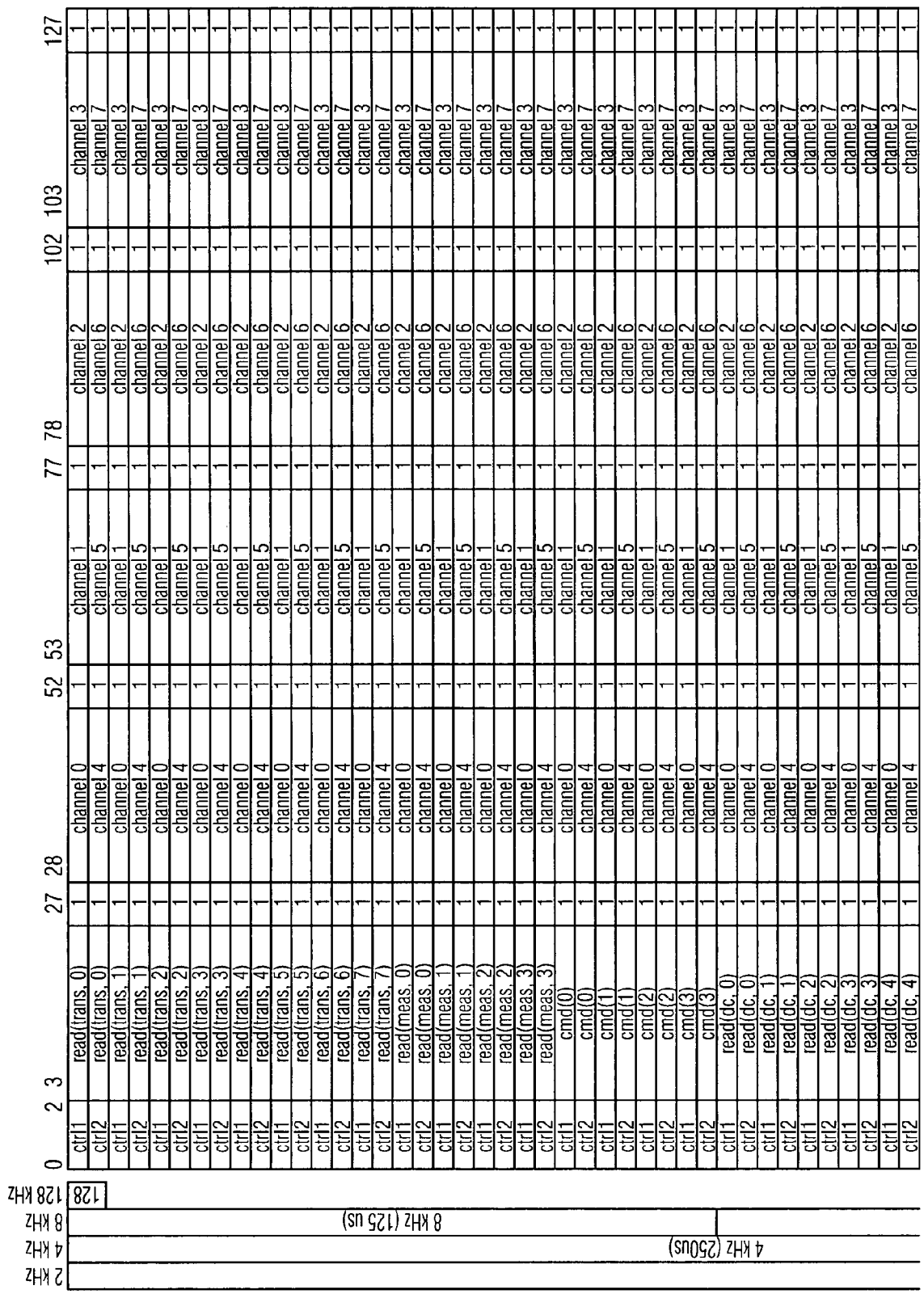

To give a more comprehensive example, FIGS. 20A-20C show an embodiment of a frame which comprises 64 128 kHz frames as shown in FIG. 10 in sequence. The frame shown in FIGS. 20A-20C lasts 500 μs and may therefore be repeated with a frequency of 2 kHz. The frame starts in FIG. 20A, is continued in FIG. 20B and is terminated in FIG. 20C.

The frame may be divided into two sub-frames each lasting 250 μs having a repetition frequency of 4 kHz or four sub-frames lasting 125 μs and having a repetition frequency of 8 kHz. As already mentioned, the frame comprises 64 frames as shown in FIG. 10 with a repetition frequency of 128 kHz.

In each 8 kHz frame, read or write commands, for example, like the ones in FIGS. 18 and 19, are performed in the first twelve 128 kHz frames and general purpose commands which may be any other command needed are performed in the last four 128 kHz frames of the 8 kHz sub-frame. In FIGS. 20A-20C, read commands are labeled "read", write commands are labeled "write" and general purpose commands are labeled "cmd". The number in brackets behind the command gives the channel which is addressed. For example, in the first 8 kHz sub-frame general purpose commands are sent to channels 0-3, in the second 8 kHz sub-frame general purpose commands are sent to channels 4-7, in the third 8 kHz sub-frame general commands are again sent to channels 0-3 and in the fourth 8 kHz sub-frame shown general purpose commands are sent to channels 4-7. In other words, in each 4 kHz sub-frame a general purpose command is sent to each channel.

Furthermore, in brackets after the read and write commands, an indication of what is read or written is given. The indications are to be taken as an example only, and in other embodiments or other situations different values may be read or written. The abbreviations given have the following meanings:

"meas" signifies the reading of measurement registers in the slaves.

"trans" designates the reading of a transversal current in the slave, in case of an analog frontend (AFE) for communication a current flowing over communication lines connected to the AFE.

"dc" signifies a DC voltage at the slave.

"uconst" relates to a constant voltage provided in the slave.

"udac/idac" relate to registers of a DC control fallback system which are written depending on the values measured.

As already mentioned, the frame of FIGS. 20A-20C are to be taken only as an example of how various commands together with data may be transmitted on the same physical lines, for example first data line 14 and second data line 15 of FIGS. 1-6. As a matter of course, other partitioning of the available channel bandwidths are also possible. Also, as a matter of course, as already mentioned if the number of channels needed is different from eight channels, the frame format may be adapted accordingly.

The above frame format and protocol may be used, in an embodiment, together with the embodiments of FIGS. 7 and 8 and/or the embodiment of FIGS. 1-6. However, the principles laid out in these embodiments may also be employed independently from each other.

What is claimed is:

1. A bus system for connecting signal processing units, the bus system comprising:
   a clock line; and
   at least one combined data and synchronization line;
   wherein said at least one combined data and synchronization line comprises a first combined data and synchronization line to transmit information from a bus master to at least one bus slave, and a second combined data and synchronization line to transmit information from said at least one slave to said bus master.

2. The bus system according to claim 1, wherein the bus system comprises a digital serial bus system.

3. The bus system according to claim 1, further comprising at least one line providing a point-to-point connection between two signal processing units.

4. The bus system according to claim 1, wherein said clock line and said at least one combined data and synchronization line are the only signal lines interconnecting all signal processing units coupled to the bus system.

5. The bus system according to claim 1, further comprising:
   a digital signal processing unit coupled to said clock line and said at least one combined data and synchronization line; and
   at least one analog signal processing unit coupled to said clock line and said at least one combined data and synchronization line.

6. The bus system according to claim 5, wherein said digital signal processing unit and said at least one analog signal processing unit comprises voice processing units.

7. A bus system for connecting signal processing units, the bus system comprising:
   a clock line; and
   at least one combined data and synchronization line;
   wherein said clock line and said at least one combined data and synchronization line are the only signal lines interconnecting all signal processing units coupled to the bus system.

8. The bus system according to claim 7, wherein the bus system comprises a digital serial bus system.

9. The bus system according to claim 7, further comprising:
   a digital signal processing unit coupled to said clock line and said at least one combined data and synchronization line; and
   at least one analog signal processing unit coupled to said clock line and said at least one combined data and synchronization line.

10. The bus system according to claim 9, wherein said digital signal processing unit and said at least one analog signal processing unit comprises voice processing units.

11. A bus system for connecting signal processing units, the bus system comprising:
    a clock line;
    at least one combined data and synchronization line;
    a digital signal processing unit coupled to said clock line and said at least one combined data and synchronization line; and
    at least one analog signal processing unit coupled to said clock line and said at least one combined data and synchronization line.

12. The bus system according to claim 11, wherein said digital signal processing unit and said at least one analog processing unit comprises a voice processing unit.

13. The bus system according to claim 11, wherein the bus system comprises a digital serial bus system.

14. The bus system according to claim 11, further comprising at least one line providing a point-to-point connection between two signal processing units.

15. A signal processing system, comprising:
    a digital signal processing unit;
    a plurality of analog signal processing units; and
    a bus system comprising a clock line and at least one data line coupling said digital signal processing unit with said plurality of analog signal processing units;
    wherein said digital signal processing unit is master of the bus system and said plurality of analog signal processing units are bus slaves of the bus system,
    wherein one of said analog signal processing units comprises a clock generator with a clock output coupled to said clock line,
    wherein the digital signal processing unit includes a clock input coupled to the clock line.

16. The signal processing system according to claim 15, wherein said analog signal processing units and said digital signal processing unit are voice processing units.

17. The signal processing system according to claim 15, wherein said plurality of analog signal processing units are connected in a daisy chain.

18. The signal processing system according to claim 15, wherein said bus system consists of said clock line and two data lines.

19. The signal processing system according to claim 15, wherein said plurality of analog signal processing units comprise subscriber line interface circuits.

20. A method for communication in a bus system, the method comprising:

transmitting data and synchronization information on a same physical connection, wherein data are transmitted to and from a plurality of signal processing units via said bus system using time division multiplex access;

wherein said physical connection comprises a first line transmitting information from a bus master to at least one bus slave and a second line transmitting said data and synchronization information from said at least one bus slave to said bus master.

21. The method according to claim 20, further comprising transmitting control commands on said physical connection.

22. The method according to claim 20, wherein communication in said bus system is performed by transmitting frames, said frames comprising parts for transmitting control and synchronization information and parts for transmitting data.

23. The method according to claim 20, wherein said data is transmitted in accordance with a protocol comprising at least one synchronization code embedded in data transmission.

24. The method according to claim 23, wherein the protocol further comprises:

a frame format to transmit data; and said frame format comprising a frame portion storing control information and a frame portion storing data.

25. The method according to claim 24, wherein said frame portion for storing data comprises a plurality of successive data channels.

26. A signal processing system, comprising:

a digital signal processing unit;

a plurality of analog signal processing units, wherein said plurality of analog signal processing units are connected in a daisy chain; and a bus system comprising a clock line and at least one data line coupling said digital signal processing unit with said plurality of analog signal processing units;

wherein said digital signal processing unit is master of the bus system and said plurality of analog signal processing units are bus slaves of the bus system, and wherein one of said analog signal processing units comprises a clock generator coupled to said clock line.

27. The signal processing system according to claim 26, wherein said analog signal processing units and said digital signal processing unit are voice processing units.

28. The signal processing system according to claim 26, wherein said bus system consists of said clock line and two data lines.

29. The signal processing system according to claim 26, wherein said plurality of analog signal processing units comprise subscriber line interface circuits.

30. A method for communication in a bus system, the method comprising:

transmitting data and synchronization information on a same physical connection, wherein data are transmitted to and from a plurality of signal processing units via said bus system using time division multiplex access;

wherein said data is transmitted in accordance with a protocol comprising at least one synchronization code embedded in data transmission;

wherein the protocol further comprises a frame format to transmit data and said frame format comprises a frame portion storing control information and a frame portion storing data; and wherein said frame portion for storing data comprises a plurality of successive data channels.

* * * * *